US010474968B2

(12) United States Patent
Chien et al.

(10) Patent No.: US 10,474,968 B2
(45) Date of Patent: *Nov. 12, 2019

(54) IMPROVING ACCURACY OF PREDICTIONS USING SEASONAL RELATIONSHIPS OF TIME SERIES DATA

(71) Applicant: SAS Institute Inc., Cary, NC (US)

(72) Inventors: Yung-Hsin Chien, Apex, NC (US); Pu Wang, Charlotte, NC (US); Yue Li, Raleigh, NC (US)

(73) Assignee: SAS INSTITUTE INC., Cary, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/209,716

(22) Filed: Dec. 4, 2018

(65) Prior Publication Data

US 2019/0108460 A1 Apr. 11, 2019

Related U.S. Application Data

(63) Continuation of application No. 15/381,564, filed on Dec. 16, 2016, now Pat. No. 10,169,720, which is a
(Continued)

(51) Int. Cl.
*G06N 20/00* (2019.01)
*G06N 5/04* (2006.01)
(Continued)

(52) U.S. Cl.
CPC ........... *G06N 20/00* (2019.01); *G06F 16/285* (2019.01); *G06N 5/04* (2013.01); *G06Q 30/0202* (2013.01); *G06F 2216/03* (2013.01)

(58) Field of Classification Search
CPC ...... G06N 99/005; G06N 5/025; G06N 7/005; G06K 9/6256; G06K 9/6269
(Continued)

(56) References Cited

U.S. PATENT DOCUMENTS 5,461,699 A 10/1995 Arbabi et al.
5,615,109 A 3/1997 Eder
(Continued)

FOREIGN PATENT DOCUMENTS

EP 2624171 A2 8/2013
WO 2002017125 A1 2/2002
WO 2005/124718 A2 12/2005

OTHER PUBLICATIONS

Aiolfi, Marco et al., "Forecast Combinations," CREATES Research Paper 2010-21, School of Economics and Management, Aarhus University, 35 pp. (May 6, 2010).
(Continued)

*Primary Examiner* — Scott A. Waldron
*Assistant Examiner* — Viker A Lamardo
(74) *Attorney, Agent, or Firm* — Kilpatrick Townsend & Stockton LLP

(57) ABSTRACT

Systems and methods are provided for performing data mining and statistical learning techniques on a big data set. More specifically, systems and methods are provided for linear regression using safe screening techniques. Techniques may include receiving a plurality of time series included in a prediction hierarchy for performing statistical learning to develop an improved prediction hierarchy. It may include pre-processing data associated with each of the plurality of time series, wherein the pre-processing includes tasks performed in parallel using a grid-enabled computing environment. For each time series, the system may determine a classification for the individual time series, a pattern group for the individual time series, and a level of the prediction hierarchy at which the each individual time series comprises an need output amount greater than a threshold amount. The computing system may generate an additional
(Continued)

prediction hierarchy using the first prediction hierarchy, the classification, the pattern group, and the level.

30 Claims, 34 Drawing Sheets

Related U.S. Application Data continuation-in-part of application No. 14/574,142, filed on Dec. 17, 2014, now abandoned.

(60) Provisional application No. 62/011,461, filed on Jun. 12, 2014, provisional application No. 61/981,174, filed on Apr. 17, 2014.

(51) Int. Cl.
*G06F 16/28* (2019.01)
*G06Q 30/02* (2012.01)

(58) Field of Classification Search
USPC .......................................................... 706/12
See application file for complete search history.

(56) References Cited

U.S. PATENT DOCUMENTS

| | | | |
|---|---|---|---|
| 5,870,746 A | 2/1999 | Knutson et al. | |
| 5,918,232 A | 6/1999 | Pouschine et al. | |
| 5,953,707 A | 9/1999 | Huang et al. | |
| 5,991,740 A | 11/1999 | Messer | |
| 5,995,943 A | 11/1999 | Bull et al. | |
| 6,052,481 A | 4/2000 | Grajski et al. | |
| 6,128,624 A | 10/2000 | Papierniak et al. | |
| 6,151,584 A | 11/2000 | Papierniak et al. | |
| 6,169,534 B1 | 1/2001 | Raffel et al. | |
| 6,189,029 B1 | 2/2001 | Fuerst | |
| 6,208,975 B1 | 3/2001 | Bull et al. | |
| 6,216,129 B1 | 4/2001 | Eldering | |
| 6,223,173 B1 | 4/2001 | Wakio et al. | |
| 6,230,064 B1 | 5/2001 | Nakase et al. | |
| 6,286,005 B1 | 9/2001 | Cannon | |
| 6,308,162 B1 | 10/2001 | Ouimet et al. | |
| 6,317,731 B1 | 11/2001 | Luciano | |
| 6,334,110 B1 | 12/2001 | Walter et al. | |
| 6,356,842 B1 | 3/2002 | Intriligator et al. | |
| 6,397,166 B1 | 5/2002 | Leung et al. | |
| 6,400,853 B1 | 6/2002 | Shiiyama | |
| 6,526,405 B1 | 2/2003 | Mannila et al. | |
| 6,539,392 B1 | 3/2003 | Rebane | |
| 6,542,869 B1 | 4/2003 | Foote | |
| 6,564,190 B1 | 5/2003 | Dubner | |
| 6,591,255 B1 | 7/2003 | Tatum et al. | |
| 6,609,085 B1 | 8/2003 | Uemura et al. | |
| 6,611,726 B1 | 8/2003 | Crosswhite | |
| 6,640,227 B1 | 10/2003 | Andreev | |
| 6,675,164 B2 * | 1/2004 | Kamath | G06K 9/6282 |
| 6,735,738 B1 | 5/2004 | Kojima | |
| 6,748,374 B1 | 6/2004 | Madan et al. | |
| 6,775,646 B1 | 8/2004 | Tufillaro et al. | |
| 6,792,399 B1 | 9/2004 | Phillips et al. | |
| 6,850,871 B1 | 2/2005 | Barford et al. | |
| 6,876,988 B2 | 4/2005 | Helsper et al. | |
| 6,878,891 B1 | 4/2005 | Josten et al. | |
| 6,928,398 B1 | 8/2005 | Fang et al. | |
| 6,978,249 B1 | 12/2005 | Beyer et al. | |
| 7,072,863 B1 | 7/2006 | Phillips et al. | |
| 7,080,026 B2 | 7/2006 | Singh et al. | |
| 7,103,222 B2 | 9/2006 | Peker | |
| 7,130,822 B1 | 10/2006 | Their et al. | |
| 7,130,833 B2 | 10/2006 | Kashima et al. | |
| 7,152,068 B2 | 12/2006 | Emery et al. | |
| 7,171,340 B2 | 1/2007 | Brocklebank | |
| 7,194,434 B2 | 3/2007 | Piccioli | |
| 7,216,088 B1 | 5/2007 | Chappel et al. | |
| 7,222,082 B1 | 5/2007 | Adhikari et al. | |
| 7,236,940 B2 | 6/2007 | Chappel | |
| 7,240,019 B2 | 7/2007 | Delurgio et al. | |
| 7,251,589 B1 | 7/2007 | Crowe et al. | |
| 7,260,550 B1 | 8/2007 | Notani | |
| 7,280,986 B2 | 10/2007 | Goldberg et al. | |
| 7,433,834 B2 | 10/2008 | Joao | |
| 7,454,420 B2 | 11/2008 | Ray et al. | |
| 7,523,048 B1 | 4/2009 | Dvorak | |
| 7,530,025 B2 | 5/2009 | Ramarajan et al. | |
| 7,562,062 B2 * | 7/2009 | Ladde | G06Q 10/00 706/12 |
| 7,565,417 B2 | 7/2009 | Rowady, Jr. | |
| 7,570,262 B2 | 8/2009 | Landau et al. | |
| 7,610,214 B1 | 10/2009 | Dwarakanath et al. | |
| 7,617,167 B2 | 11/2009 | Griffis et al. | |
| 7,624,114 B2 | 11/2009 | Paulus et al. | |
| 7,660,734 B1 | 2/2010 | Neal et al. | |
| 7,664,618 B2 | 2/2010 | Cheung et al. | |
| 7,689,456 B2 | 3/2010 | Schroeder et al. | |
| 7,693,737 B2 | 4/2010 | Their et al. | |
| 7,702,482 B2 | 4/2010 | Graepel et al. | |
| 7,711,734 B2 | 5/2010 | Leonard et al. | |
| 7,716,022 B1 | 5/2010 | Park et al. | |
| 7,941,413 B2 | 5/2011 | Kashiyama et al. | |
| 8,005,707 B1 | 8/2011 | Jackson et al. | |
| 8,010,324 B1 * | 8/2011 | Crowe | G06Q 10/10 702/181 |
| 8,010,404 B1 | 8/2011 | Wu et al. | |
| 8,014,983 B2 * | 9/2011 | Crowe | G06Q 10/10 702/181 |
| 8,015,133 B1 | 9/2011 | Wu et al. | |
| 8,112,302 B1 | 2/2012 | Trovero et al. | |
| 8,321,479 B2 | 11/2012 | Bley | |
| 8,326,677 B1 | 12/2012 | Fan et al. | |
| 8,364,517 B2 | 1/2013 | Trovero et al. | |
| 8,374,903 B2 | 2/2013 | Little | |
| 8,489,622 B2 * | 7/2013 | Joshi | G06F 16/2477 707/754 |
| 8,631,040 B2 | 1/2014 | Jackson et al. | |
| 9,047,559 B2 * | 6/2015 | Brzezicki | G06N 7/005 703/2 |
| 9,460,402 B2 * | 10/2016 | Rope | G06Q 10/00 |
| 2002/0169657 A1 | 11/2002 | Singh et al. | |
| 2002/0169658 A1 | 11/2002 | Adler | |
| 2003/0101009 A1 | 5/2003 | Seem | |
| 2003/0105660 A1 | 6/2003 | Walsh et al. | |
| 2003/0110016 A1 | 6/2003 | Stefek et al. | |
| 2003/0154144 A1 | 8/2003 | Pokorny et al. | |
| 2003/0187719 A1 | 10/2003 | Brocklebank | |
| 2003/0200134 A1 | 10/2003 | Leonard et al. | |
| 2003/0212590 A1 | 11/2003 | Klingler | |
| 2004/0030667 A1 | 2/2004 | Xu et al. | |
| 2004/0041727 A1 | 3/2004 | Ishii et al. | |
| 2004/0103095 A1 * | 5/2004 | Matsugu | G06K 9/00281 |
| 2004/0172225 A1 | 9/2004 | Hochberg et al. | |
| 2004/0230470 A1 | 11/2004 | Svilar et al. | |
| 2005/0102107 A1 | 5/2005 | Porikli | |
| 2005/0114391 A1 | 5/2005 | Corcoran et al. | |
| 2005/0159997 A1 | 7/2005 | John | |
| 2005/0177351 A1 | 8/2005 | Goldberg et al. | |
| 2005/0209732 A1 | 9/2005 | Audimoolam et al. | |
| 2005/0055275 A1 | 10/2005 | Newman et al. | |
| 2005/0249412 A1 | 11/2005 | Radhakrishnan et al. | |
| 2005/0271156 A1 | 12/2005 | Nakano | |
| 2006/0063156 A1 | 3/2006 | Willman et al. | |
| 2006/0064181 A1 | 3/2006 | Kato | |
| 2006/0085380 A1 | 4/2006 | Cote et al. | |
| 2006/0112028 A1 | 5/2006 | Xiao et al. | |
| 2006/0143081 A1 | 6/2006 | Argaiz | |
| 2006/0164997 A1 | 7/2006 | Graepel et al. | |
| 2006/0224356 A1 * | 10/2006 | Castelli | G06K 9/00523 702/176 |
| 2006/0241923 A1 | 10/2006 | Xu et al. | |
| 2006/0247900 A1 | 11/2006 | Brocklebank | |
| 2007/0011175 A1 | 1/2007 | Langseth et al. | |
| 2007/0055604 A1 | 3/2007 | Their et al. | |
| 2007/0094168 A1 | 4/2007 | Ayala et al. | |
| 2007/0118491 A1 | 5/2007 | Baum et al. | |

(56) References Cited

U.S. PATENT DOCUMENTS

| | | | |
|---|---|---|---|
| 2007/0208608 A1 | 6/2007 | Amerasinghe et al. | |
| 2007/0162301 A1 | 7/2007 | Sussman et al. | |
| 2007/0203783 A1 | 8/2007 | Beltramo | |
| 2007/0208492 A1 | 9/2007 | Downs et al. | |
| 2007/0106550 A1 | 10/2007 | Umblijs et al. | |
| 2007/0291958 A1 | 12/2007 | Jehan | |
| 2008/0040202 A1 | 2/2008 | Walser et al. | |
| 2008/0208832 A1 | 8/2008 | Friedlander et al. | |
| 2008/0288537 A1 | 11/2008 | Golovchinsky et al. | |
| 2008/0294651 A1 | 11/2008 | Masuyama et al. | |
| 2009/0018996 A1 | 1/2009 | Hunt et al. | |
| 2009/0172035 A1 | 7/2009 | Lessing et al. | |
| 2009/0216611 A1 | 8/2009 | Leonard et al. | |
| 2009/0319310 A1 | 12/2009 | Little | |
| 2010/0030521 A1 | 2/2010 | Akhrarov et al. | |
| 2010/0063974 A1 | 3/2010 | Papadimitriou et al. | |
| 2010/0106561 A1 | 4/2010 | Peredriy et al. | |
| 2010/0114899 A1 | 5/2010 | Guha et al. | |
| 2010/0121868 A1 | 5/2010 | Biannic et al. | |
| 2010/0257133 A1* | 10/2010 | Crowe | G06Q 10/10 706/58 |
| 2011/0035071 A1* | 2/2011 | Sun | H02J 3/00 700/291 |
| 2011/0106723 A1 | 5/2011 | Chipley et al. | |
| 2011/0119374 A1 | 5/2011 | Ruhl et al. | |
| 2011/0145223 A1 | 6/2011 | Cormode et al. | |
| 2011/0208701 A1 | 8/2011 | Jackson et al. | |
| 2011/0307503 A1 | 12/2011 | Dlugosch | |
| 2012/0053989 A1 | 3/2012 | Richard | |
| 2012/0265881 A1 | 10/2012 | Chen et al. | |
| 2012/0310939 A1 | 12/2012 | Lee et al. | |
| 2013/0024167 A1 | 1/2013 | Blair et al. | |
| 2013/0024173 A1* | 1/2013 | Brzezicki | G06N 7/005 703/6 |
| 2013/0238399 A1 | 9/2013 | Chipley et al. | |
| 2014/0019088 A1 | 1/2014 | Leonard et al. | |
| 2014/0019448 A1* | 1/2014 | Leonard | G06F 17/18 707/736 |
| 2014/0019909 A1 | 1/2014 | Leonard et al. | |
| 2014/0257778 A1 | 9/2014 | Leonard et al. | |
| 2015/0052173 A1* | 2/2015 | Leonard | G06F 16/211 707/792 |
| 2015/0302432 A1 | 10/2015 | Chien et al. | |
| 2015/0302433 A1 | 10/2015 | Li | |
| 2017/0228661 A1 | 8/2017 | Chien | |

OTHER PUBLICATIONS

Automatic Forecasting Systems Inc., Autobox 5.0 for Windows User's Guide, 82 pp. (1999).

Choudhury, J. Paul et al., "Forecasting of Engineering Manpower Through Fuzzy Associative Memory Neural Network with ARIMA: A Comparative Study", Neurocomputing, vol. 47, Iss. 1-4, pp. 241-257 (Aug. 2002).

Costantini, Mauro et al., "Forecast Combination Based on Multiple Encompassing Tests in a Macroeconomic DSGE System," Reihe Okonomie/ Economics Series 251, 24 pp. (May 2010).

Data Mining Group, available at http://www.dmg.org, printed May 9, 2005, 3 pp.

Funnel Web, Web site Analysis. Report, Funnel Web Demonstration, Authenticated Users History, http://www.quest.com/funnel.sub.--web/analyzer/sample/UserHist.html (1 pg.), Mar. 2002.

Funnel Web, Web site Analysis Report, Funnel Web Demonstration, Clients History, http://www/quest.com/funnel.sub.--web/analyzer/sample.ClientHist- .html (2 pp.), Mar. 2002.

Garavaglia, Susan et al., "A Smart Guide to Dummy Variables: Four Applications and a Macro," accessed from: http://web.archive.org/web/20040728083413/http://www.ats.ucla.edu/stat/sa- s/library/nesug98/p046.pdf, (2004).

Guerard John B. Jr., Automatic Time Series Modeling, Intervention Analysis, and Effective Forecasting. (1989) Journal of Statistical Computation and Simulation, 1563-5163, vol. 34, Issue 1, pp. 43-49.

Guralnik, V. and Srivastava, J., Event Detection from Time Series Data (1999), Proceedings of the 5th ACM SIGKDD International Conference on Knowledge Discovery and Data Mining, pp. 33-42.

Harrison, H.C. et al., "An Intelligent Business Forecasting System", ACM Annual Computer Science Conference, pp. 229-236 (1993).

Harvey, Andrew, "Forecasting with Unobserved Components Time Series Models," Faculty of Economics, University of Cambridge, Prepared for Handbook of Economic Forecasting, pp. 1-89 (Jul. 2004).

Jacobsen, Erik et al., "Assigning Confidence to Conditional Branch Predictions", IEEE, Proceedings of the 29th Annual International Symposium on Microarchitecture, 12 pp. (Dec. 2-4, 1996).

Keogh, Eamonn J. et al., "Derivative Dynamic Time Warping", In First SIAM International Conference on Data Mining (SDM'2001), Chicago, USA, pp. 1-11 (2001).

Kobbacy, Khairy A.H., et al., Abstract, "Towards the development of an intelligent inventory management system," Integrated Manufacturing Systems, vol. 10, Issue 6, (1999) 11 pp.

Kumar, Mahesh, "Combining Forecasts Using Clustering", Rutcor Research Report 40-2005, cover page and pp. 1-16 (Dec. 2005).

Leonard, Michael et al., "Mining Transactional and Time Series Data", abstract and presentation, International Symposium of Forecasting, 23 pp. (2003).

Leonard, Michael et al., "Mining Transactional and Time Series Data", abstract, presentation and paper, SUGI, 142 pp. (Apr. 10-13, 2005).

Leonard, Michael, "Large-Scale Automatic Forecasting Using Inputs and Calendar Events", abstract and presentation, International Symposium on Forecasting Conference, 56 pp. (Jul. 4-7, 2004).

Leonard, Michael, "Large-Scale Automatic Forecasting Using Inputs and Calendar Events", White Paper, pp. 1-27 (2005).

Leonard, Michael, "Large-Scale Automatic Forecasting: Millions of Forecasts", abstract and presentation, International Symposium of Forecasting, 156 pp. (2002).

Leonard, Michael, "Predictive Modeling Markup Language for Time Series Models", abstract and presentation, International Symposium on Forecasting Conference, 35 pp. (Jul. 4-7, 2004).

Leonard, Michael, "Promotional Analysis and Forecasting for Demand Planning: A Practical Time Series Approach", with exhibits 1 and 2, SAS Institute Inc., Cary, North Carolina, 50 pp. (2000).

Lu, Sheng et al., "A New Algorithm for Linear and Nonlinear ARMA Model Parameter Estimation Using Affine Geometry", IEEE Transactions on Biomedical Engineering, vol. 48, No. 10, pp. 1116-1124 (Oct. 2001).

Malhotra, Manoj K. et al., "Decision making using multiple models", European Journal of Operational Research, 114, pp. 1-14 (1999).

McQuarrie, Allan D.R. et al., "Regression and Time Series Model Selection", World Scientific Publishing Co. Pte. Ltd., 40 pp. (1998).

Oates, Tim et al., "Clustering Time Series with Hidden Markov Models and Dynamic Time Warping", Computer Science Department, LGRC University of Massachusetts, In Proceedings of the IJCAI-99, 5 pp. (1999).

Park, Kwan Hee, Abstract "Development and evaluation of a prototype expert system for forecasting models", Mississippi State University, 1990, 1 pg.

Product Brochure, Forecast Pro, 2000, 12 pp.

Quest Software, "Funnel Web Analyzer: Analyzing the Way Visitors Interact with Your Web Site", http://www.quest.com/funnel.sub.--web/analyzer (2 pp.), Mar. 2002.

Safavi, Alex "Choosing the right forecasting software and system." The Journal of Business Forecasting Methods & Systems 19.3 (2000): 6-10. ABI/INFORM Global, ProQuest.

SAS Institute Inc., SAS/ETS User's Guide, Version 8, Cary NC; SAS Institute Inc., (1999) 1543 pages.

Seasonal Dummy Variables, Mar. 2004, http://shazam.econ.ubc.ca/intro/dumseas.htm, Accessed from: http://web.archive.org/web/20040321055948/http://shazam.econ.ubc.ca/intro- /dumseas.htm.

Simoncelli, Eero, "Least Squares Optimization," Center for Neural Science, and Courant Institute of Mathematical Sciences, pp. 1-8 (Mar. 9, 2005).

(56) References Cited

OTHER PUBLICATIONS

Tashman, Leonard J. et al., Abstract "Automatic Forecasting Software: A Survey and Evaluation", International Journal of Forecasting, vol. 7, Issue 2, Aug. 1991, 1 pg.
Using Predictor Variables, (1999) SAS OnlineDoc: Version 8, pp. 1325-1349, Accessed from: http://www.okstate.edu/sas/v8/saspdf/ets/chap27.pdf.
Van Wijk, Jarke J. et al., "Cluster and Calendar based Visualization of Time Series Data", IEEE Symposium on Information Visualization (INFOVIS '99), San Francisco, pp. 1-6 (Oct. 25-26, 1999).
Vanderplaats, Garret N., "Numerical Optimization Techniques for Engineering Design", Vanderplaats Research & Development (publisher), Third Edition, 18 pp. (1999).
Wang, Liang et al., "An Expert System for Forecasting Model Selection", IEEE, pp. 704-709 (1992).
Atuk, Oguz et al., "Seasonal Adjustment in Economic Time Series," Statistics Department, Discussion Paper No. 2002/1, Central Bank of the Republic of Turkey, Central Bank Review, 15 pp. (2002).
Babu, G., "Clustering in non-stationary environments using a clan-based evolutionary approach," Biological Cybernetics, Sep. 7, 1995, Springer Berlin I Heidelberg, pp. 367-374, vol. 73, Issue: 4.
Bruno, Giancarlo et al., "The Choice of Time Intervals in Seasonal Adjustment: A Heuristic Approach," Institute for Studies and Economic Analysis, Rome Italy, 14 pp. (2004).
Bruno, Giancarlo et al., "The Choice of Time Intervals in Seasonal Adjustment: Characterization and Tools," Institute for Studies and Economic Analysis, Rome, Italy, 21 pp. (Jul. 2001).
Bradley, D.C. et al., "Quantitation of measurement error with Optimal Segments: basis for adaptive time course smoothing," Am J Physiol Endocrinol Metab Jun. 1, 1993 264:(6) E902-E911.
Huang, N. E. et al.,"Applications of Hilbert-Huang transform to non-stationary financial time series analysis." Appl. Stochastic Models Bus. Ind., 19: 245-268 (2003).
IBM, "IBM Systems, IBM PowerExecutive Installation and User's Guide," Version 2.10, 62 pp. (Aug. 2007).
Kalpakis, K. et al., "Distance measures for effective clustering of ARIMA time-series," Data Mining, 2001. ICDM 2001, Proceedings IEEE International Conference on, vol., No., pp. 273-280, 2001.
Keogh, E. et al., "An online algorithm for segmenting time series," Data Mining, 2001. ICDM 2001, Proceedings IEEE International Conference on, vol., No., pp. 289-296, 2001.
Keogh, Eamonn et al., "Segmenting Time Series: A Survey and Novel Approach," Department of Information and Computer Science, University of California, Irvine, California 92697, 15 pp. (2004).
Palpanas, T. et al, "Online amnesic approximation of streaming time series," Data Engineering, 2004. Proceedings. 20th International Conference on, vol., No., pp. 339-349, Mar. 30-Apr. 2, 2004.
Wang Xiao-Ye; Wang Zheng-Ou; "A structure-adaptive piece-wise linear segments representation for time series," Information Reuse and Integration, 2004. IR I 2004. Proceedings of the 2004 IEEE International Conference on, vol., No., pp. 433-437, Nov. 8-10, 2004.
Yu, Lean et al., "Time Series Forecasting with Multiple Candidate Models: Selecting or Combining?" Journal of System Science and Complexity, vol. 18, No. 1, pp. 1-18 (Jan. 2005).
Wang, Ming-Yeu et al., "Combined forecast process: Combining scenario analysis with the technological substitution model," Technological Forecasting and Social Change, vol. 74, pp. 357-378 (2007).
Green, Kesten C. et al., "Structured analogies for forecasting" International Journal of Forecasting, vol. 23, pp. 365-376 (2007).
Agarwal, Deepak et al., "Efficient and Effective Explanation of Change in Hierarchical Summaries", The 13th International Conference on Knowledge Discovery and Data Mining 2007, Aug. 12-15, 2007 (10 pages).
Hyndman, Rob J. et al., "Optimal combination forecasts for hierarchical time series", Monash University, Department of Econometrics and Business Statistics, http://www.buseco.monash.edu.au/de)lts/ebs/pubs/w)lapers/ (2007) 23 pages.

* cited by examiner

IMPROVING ACCURACY OF PREDICTIONS USING SEASONAL RELATIONSHIPS OF TIME SERIES DATA

CROSS-REFERENCE TO RELATED APPLICATIONS

This application is a continuation of U.S. patent application Ser. No. 15/381,564 filed on Dec. 16, 2016 (U.S. Pat. No. 10,169,720 B2), which is a continuation-in-part of U.S. patent application Ser. No. 14/574,142 filed on Dec. 17 (Abandoned), 2014, which claims the benefit of priority under 35 U.S.C. § 119(e) to U.S. Provisional Application No. 62/011,461, filed Jun. 12, 2014 and U.S. Provisional Application No. 61/981,174, filed Apr. 17, 2014, which are hereby incorporated by reference in their entirety.

SUMMARY

In accordance with the teachings provided herein, systems and methods for improving the accuracy and the efficiency of prediction processes. Certain aspects of the disclosed subject matter relate to a system that has the capability to automatically add to its current integrated collection of facts and relationships. This system may use induction, deduction, applications involving learning (i.e., data mining and knowledge discovery) and statistical learning techniques. For example, a system or method may include performing data mining and statistical learning techniques on a big data set, for example using a grid-enabled computing environment.

BRIEF DESCRIPTION OF THE DRAWINGS

Like reference numbers and designations in the various drawings indicate like elements.

DETAILED DESCRIPTION

Figure 1:
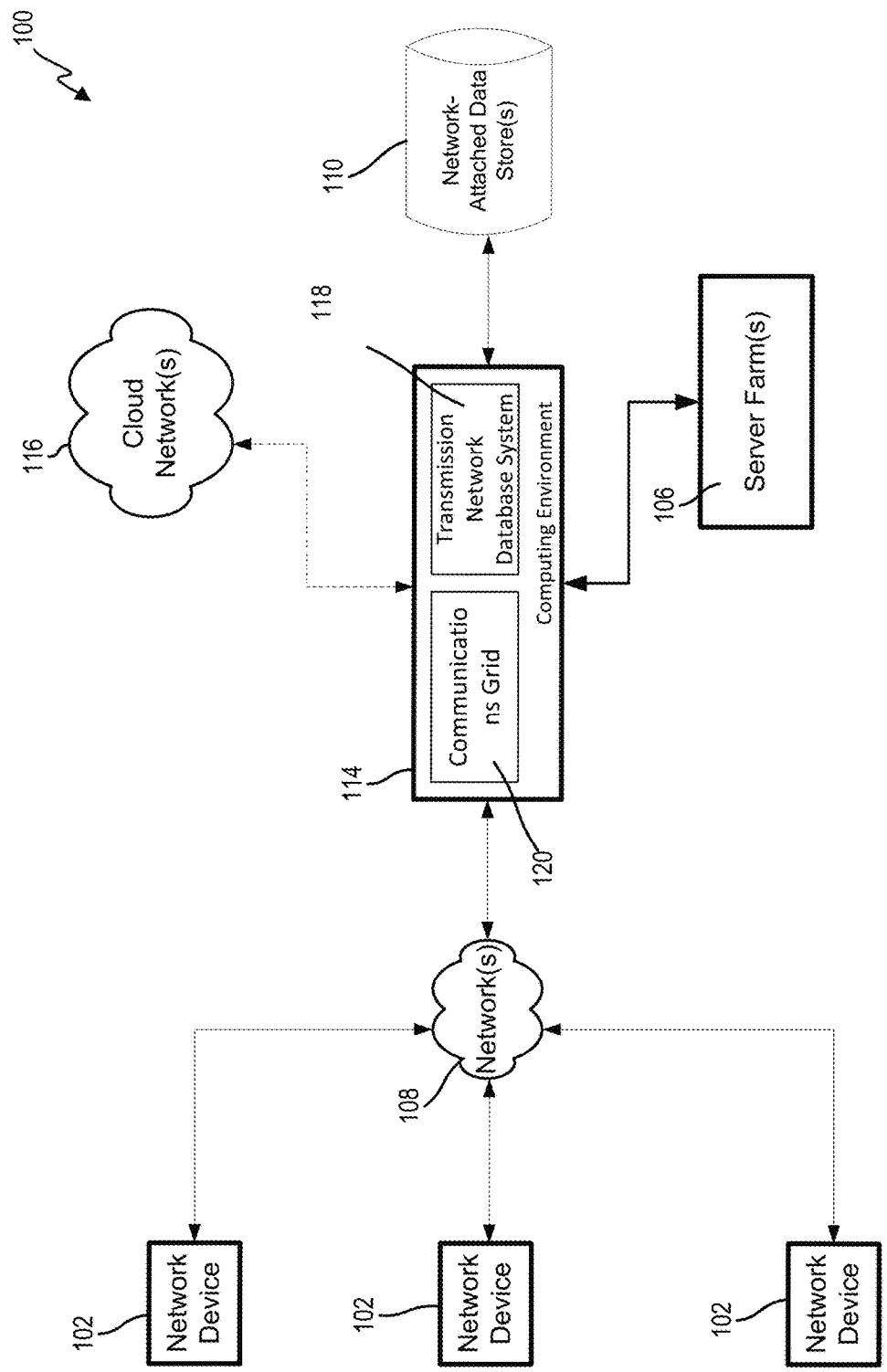
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
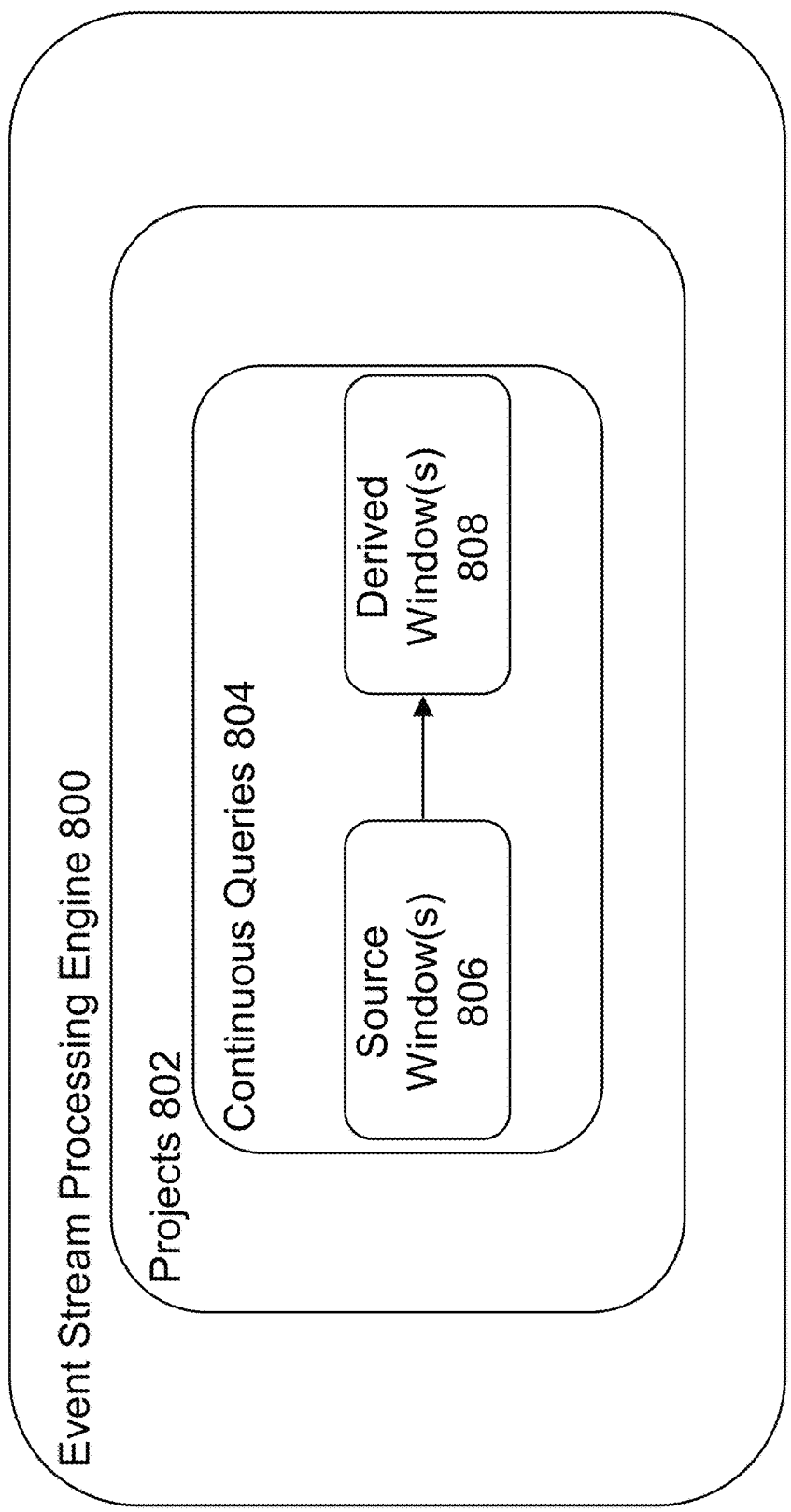
FIG. 8 illustrates a block diagram including components of an Event Stream Processing Engine (ESPE), according to embodiments of the present technology.
Figure 9:
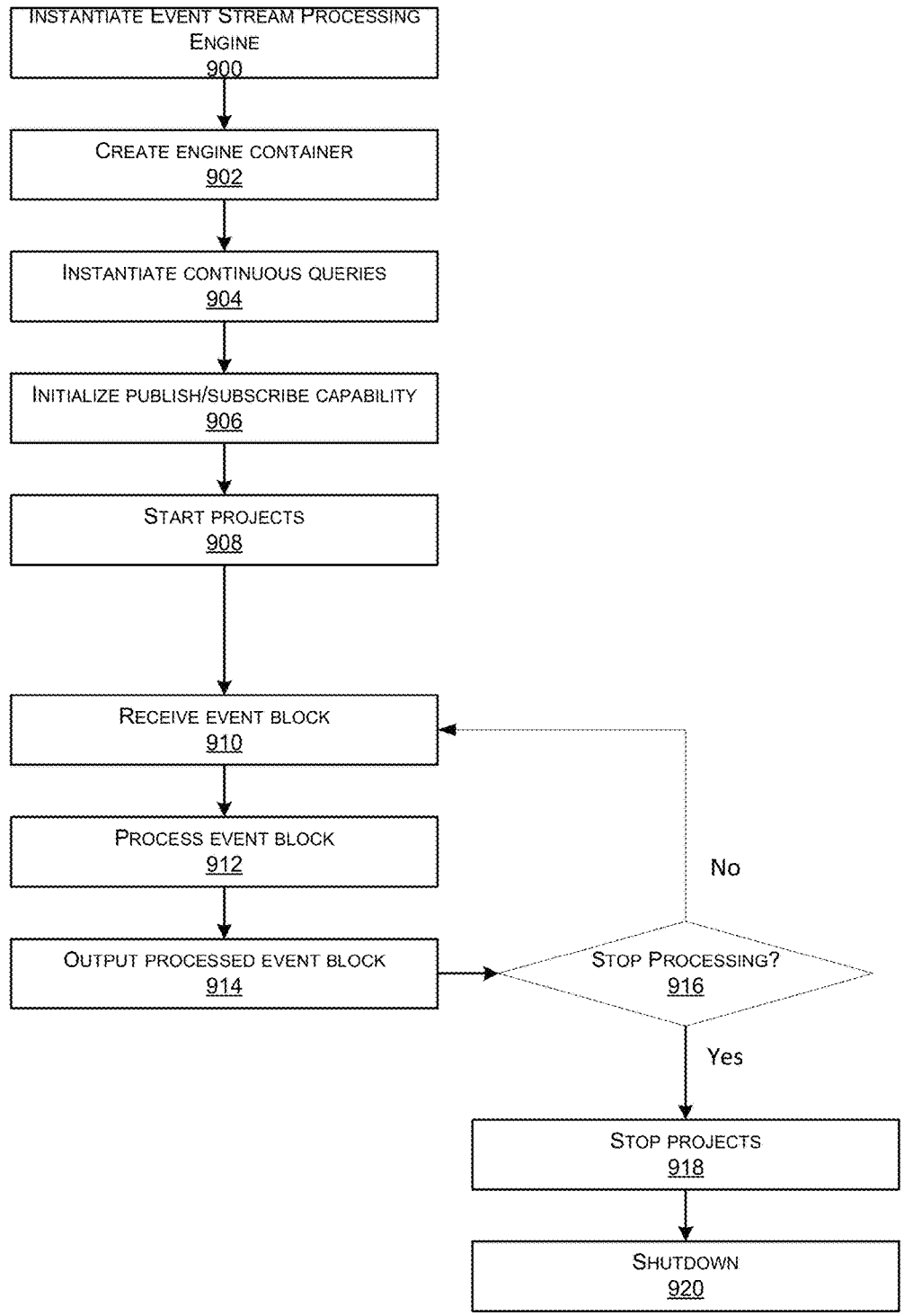
FIG. 9 illustrates a flow chart showing an example process including operations performed by an event stream processing engine, according to some embodiments of the present technology.
Figure 10:
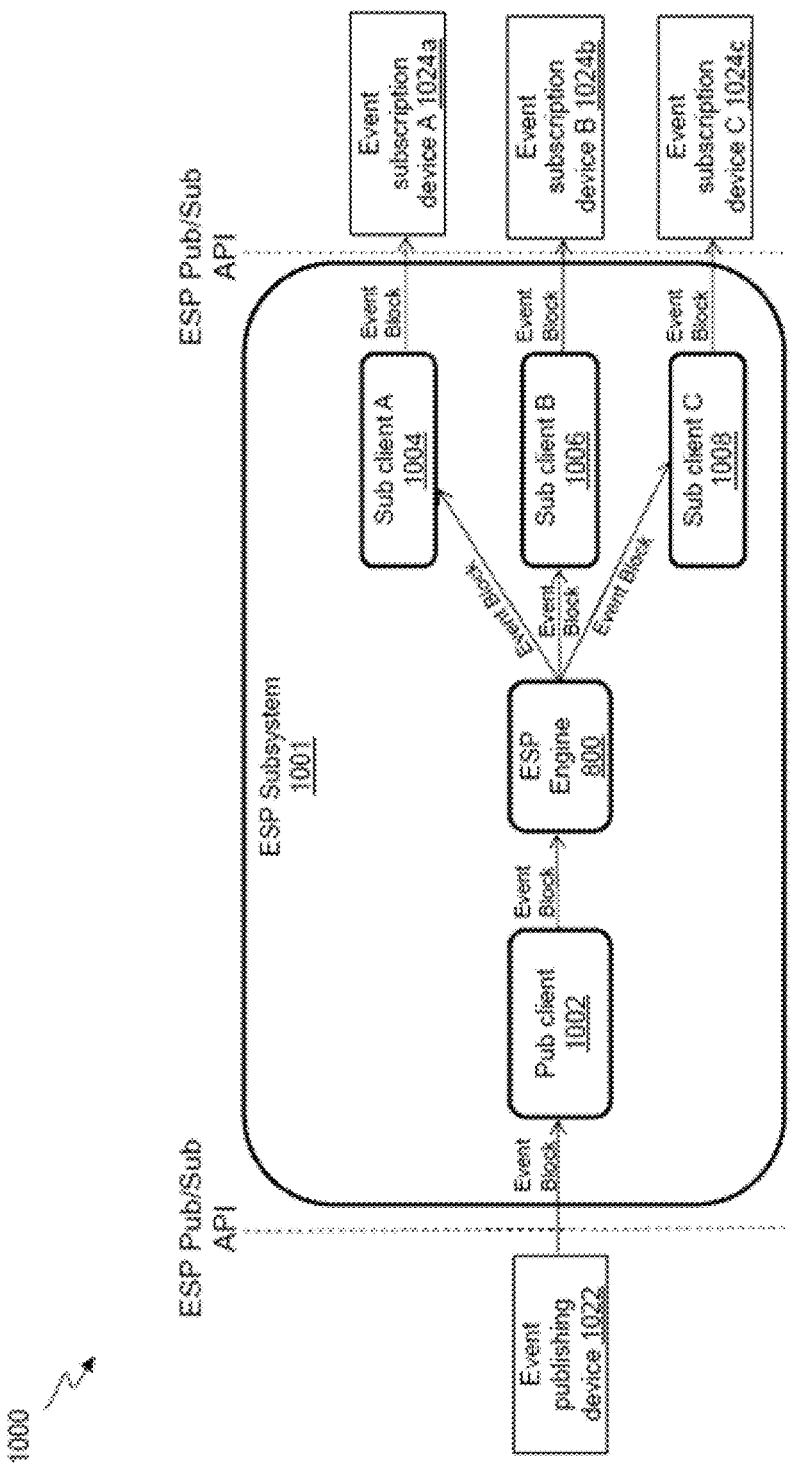
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product performance databases (e.g., a database containing individual data records identifying details of individual product performance).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on-demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on-demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
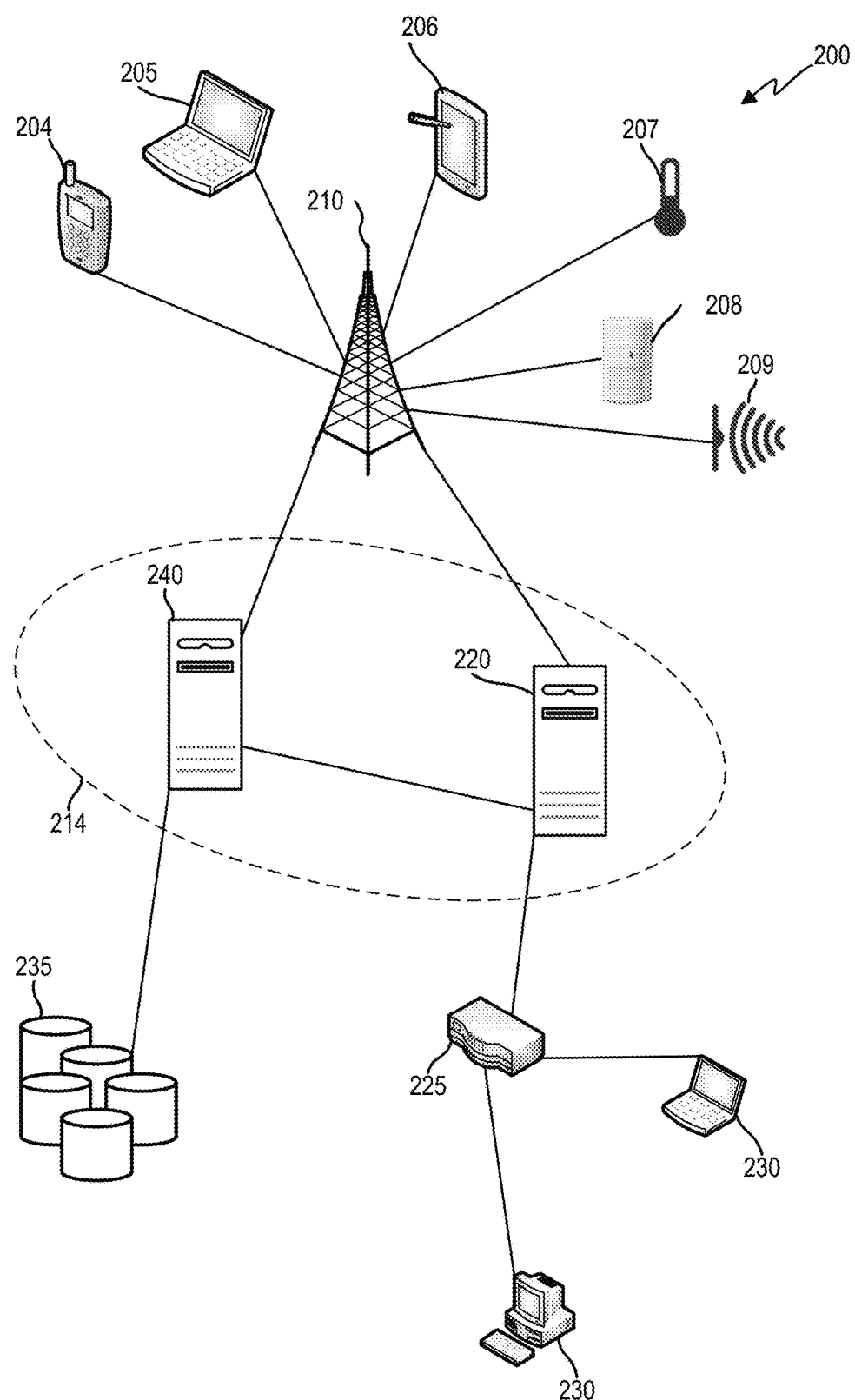
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
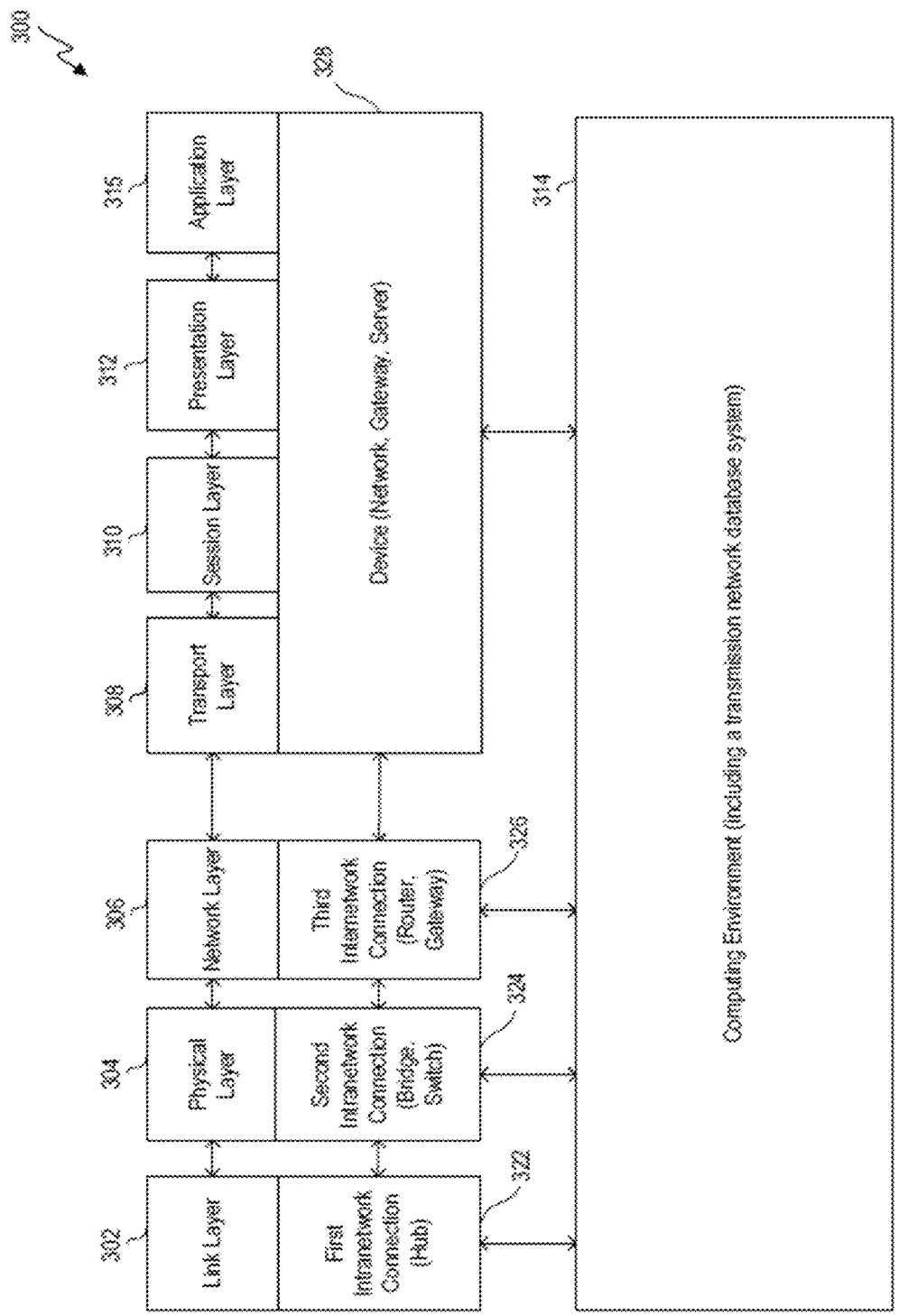
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 315 interacts directly with software applications and end users, and manages communications between them. Application layer 315 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-315. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
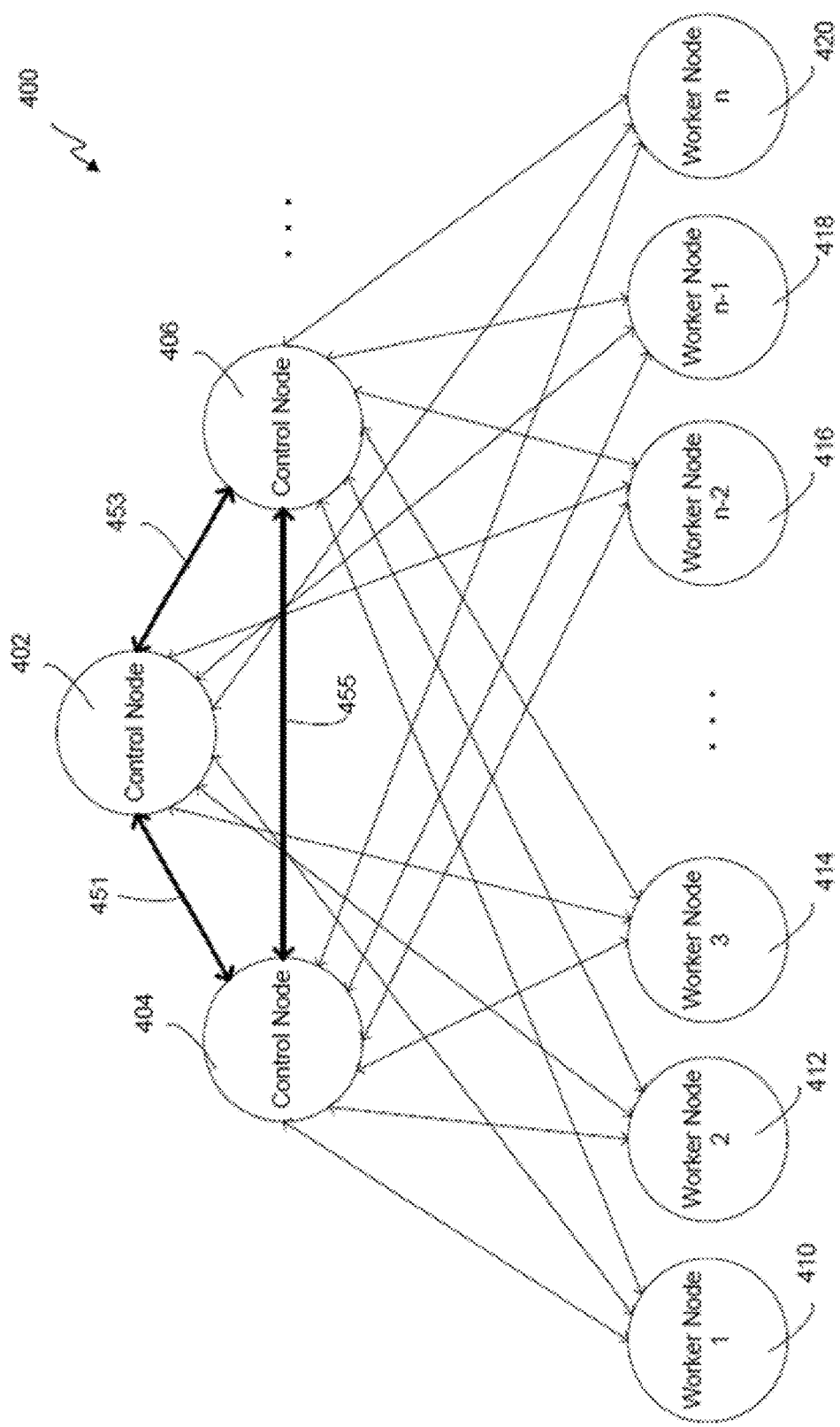
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets.

The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
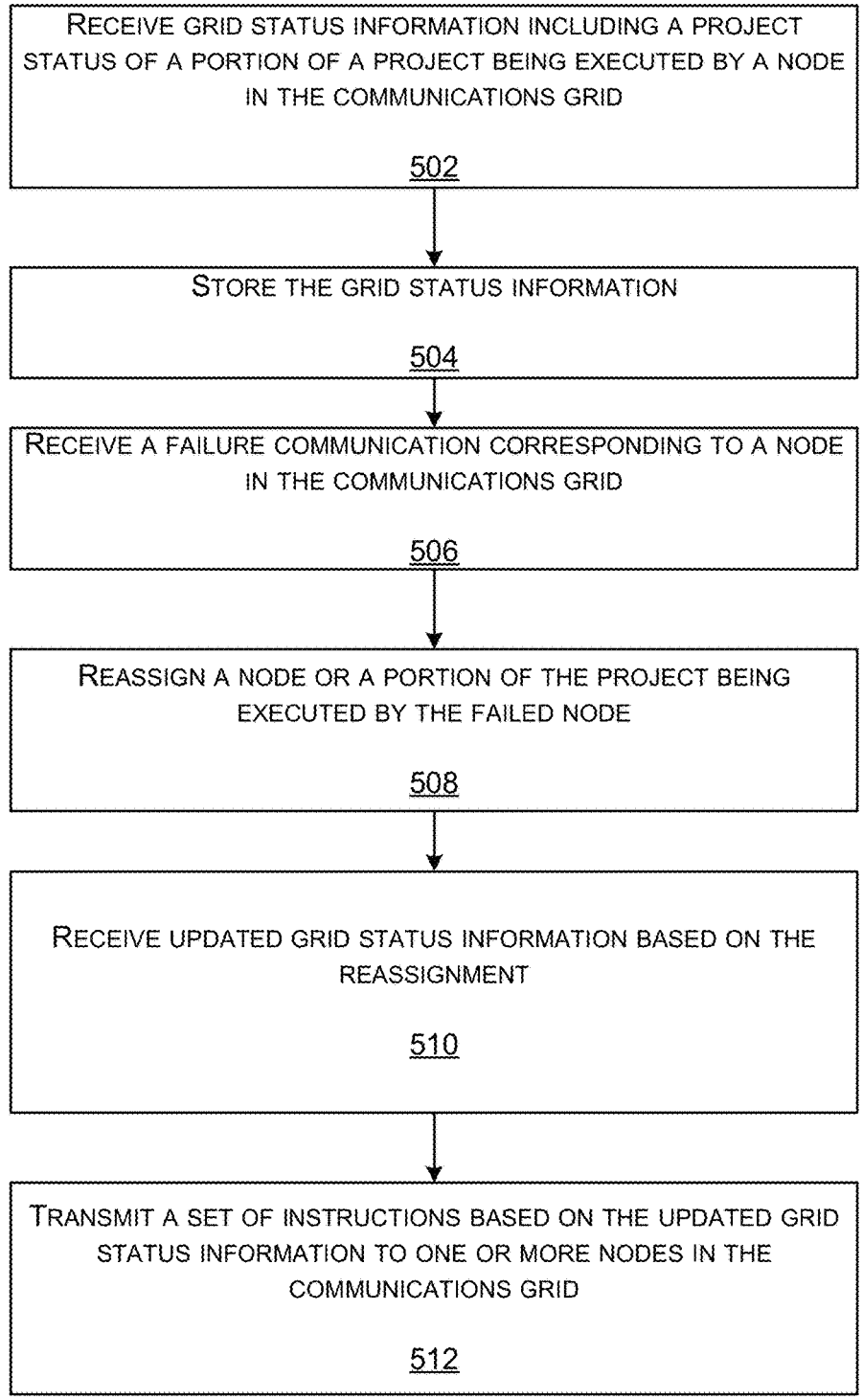
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
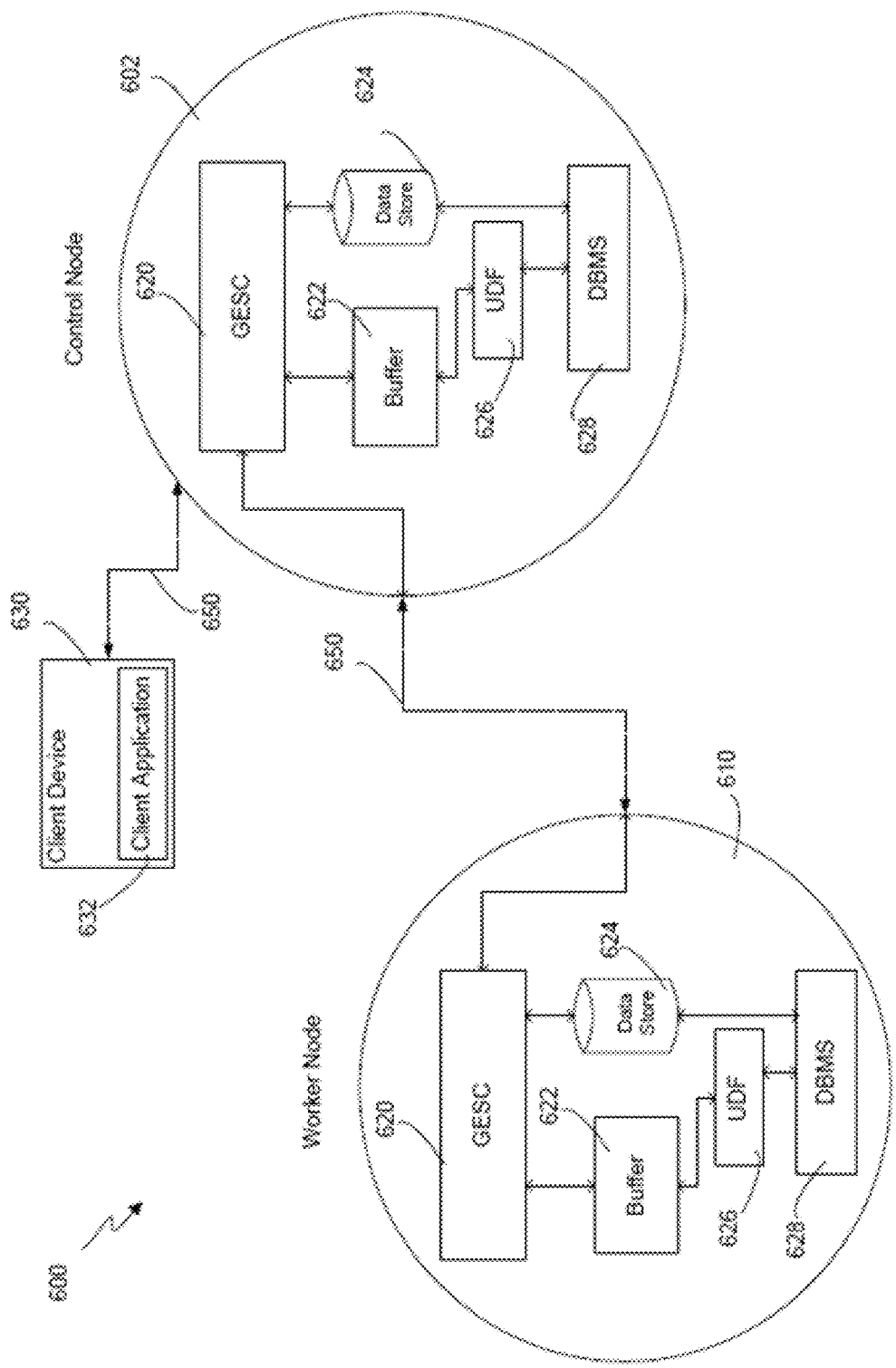
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
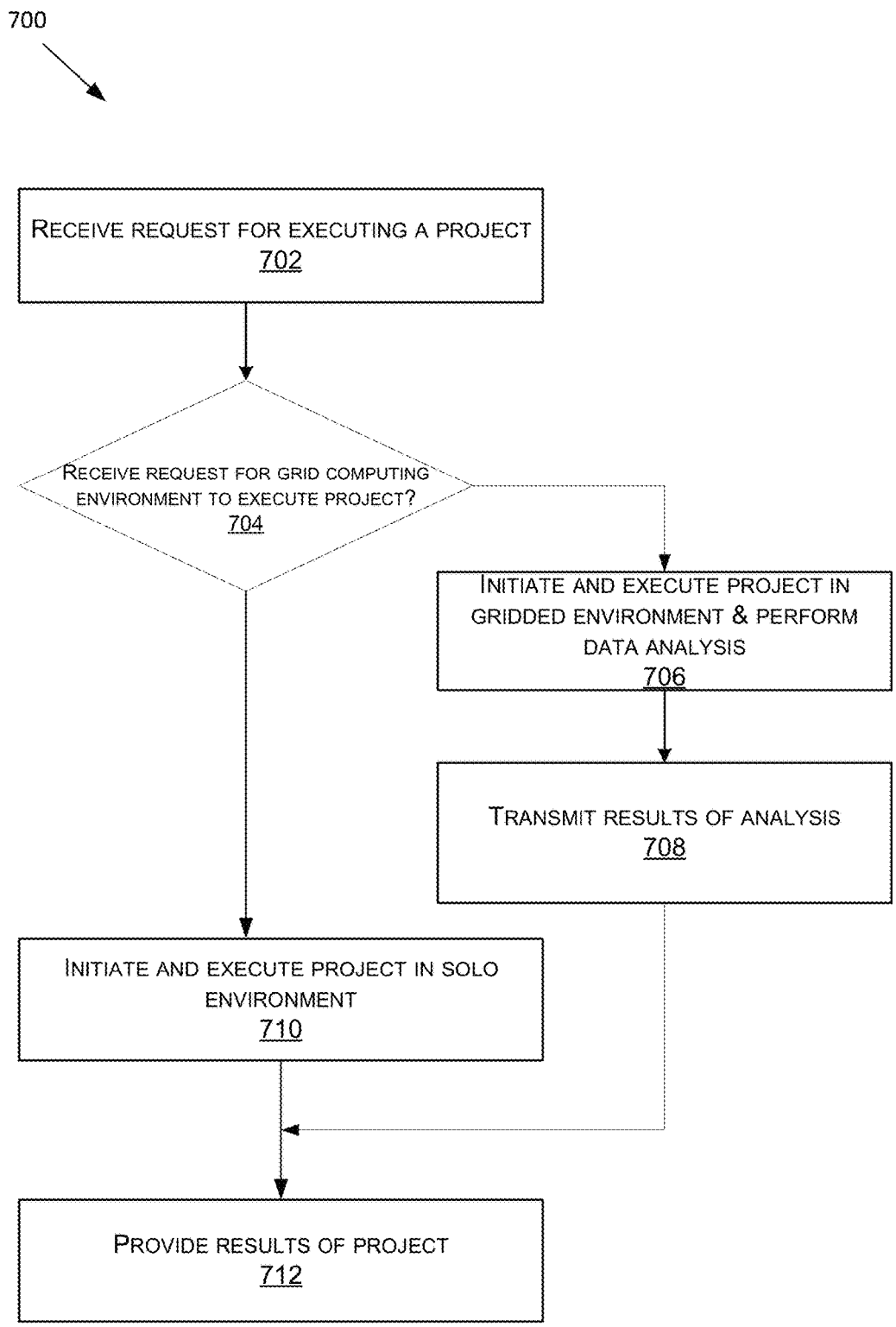
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 804, subscribing client B 806, and subscribing client C 808 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

In various embodiments, systems, methods, and products of the invention are used to enhanced prediction performance using classification and segmentation. U.S. patent application Ser. No. 14/574,142, filed on Dec. 17, 2014, which is hereby incorporated by reference in its entirety for all purposes, discloses useful systems, methods, and products for predicting performance.

Certain aspects of the disclosed subject matter relate to a system that has the capability to automatically add to its current integrated collection of facts and relationships. This system may use induction, deduction, applications involving learning (i.e., data mining and knowledge discovery) and statistical learning techniques.

More specifically, certain aspects of the disclosed subject matter relate to public need output classification and segmentation, which may enhance or generate a hierarchy so that prediction accuracy can be improved while maintaining ease of controlling big data. Techniques discussed herein can enable users to analyze and classify time series into a set of pre-determined classifications based on certain criteria. "Time series," as used herein, refers to a sequence of data points, typically consisting of successive measurements made over a time interval. References to "time series" is intended to refer to one or more individual time series unless otherwise specified. For each classification, each time series may be further grouped based on public need output patterns and amount characteristics. A strategy can then be applied to the prediction process to improve the prediction accuracy.

Public need output classification can be accomplished using multiple modules. For example, a public need output classification and segmentation engine may include three modules: a classification module, a pattern-clustering module, and an amount-grouping module. A classification module may analyze each time series and classify each time series based on characteristics such as performance lifecycle, intermittence, and time period of each year, so that appropriate modeling techniques can be applied to each time series. A pattern-clustering module may group one or more time series into different clusters based on similar performance patterns as well as the performance characteristics generated from the classification module. Performance at lower levels of the hierarchy might often be insufficient to generate accurate predictions due to low signal to noise ratio. Accordingly, an amount-grouping module may be used to automatically identify an appropriate data combination level based on a user-defined hierarchy to generate robust and reliable predictions. The generated predictions may then be used to reconcile to lower level predictions.

Figure 11:
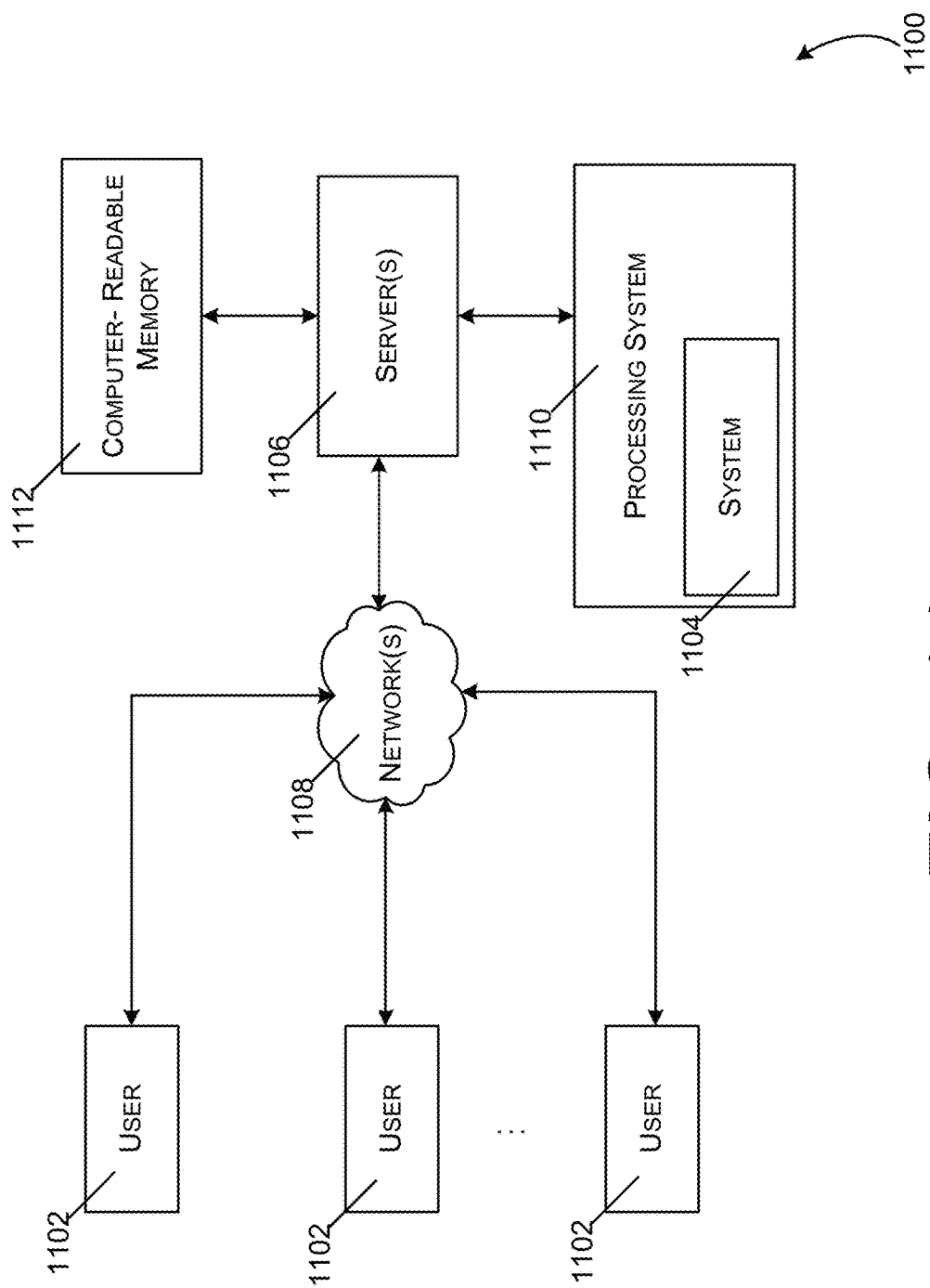
FIG. 11 illustrates a block diagram of an example of a computer-implemented environment for analyzing one or more time series.

FIG. 11 illustrates a block diagram 1100 of an example of a computer-implemented environment for analyzing one or more time series. Users 1102 can interact with a system 1104 hosted on one or more servers 1106 through one or more networks 1108. The system 1104 can contain software operations or routines. The users 1102 can interact with the system 1104 through a number of ways, such as over networks 1108. Servers 1106, accessible through the networks 1108, can host system 1104. The system 1104 can also be provided on a stand-alone computer for access by a user.

In one example, the environment 1100 may include a stand-alone computer architecture where a processing system 1110 (e.g., one or more computer processors) includes the system 1104 being executed on it. The processing system 1110 has access to a computer-readable memory 1112.

In one example, the environment 1100 may include a client-server architecture. Users 1102 may utilize a PC to access servers 1106 running a system 1104 on a processing system 1110 via networks 1108. The servers 1106 may access a computer-readable memory 1112.

Figure 12:
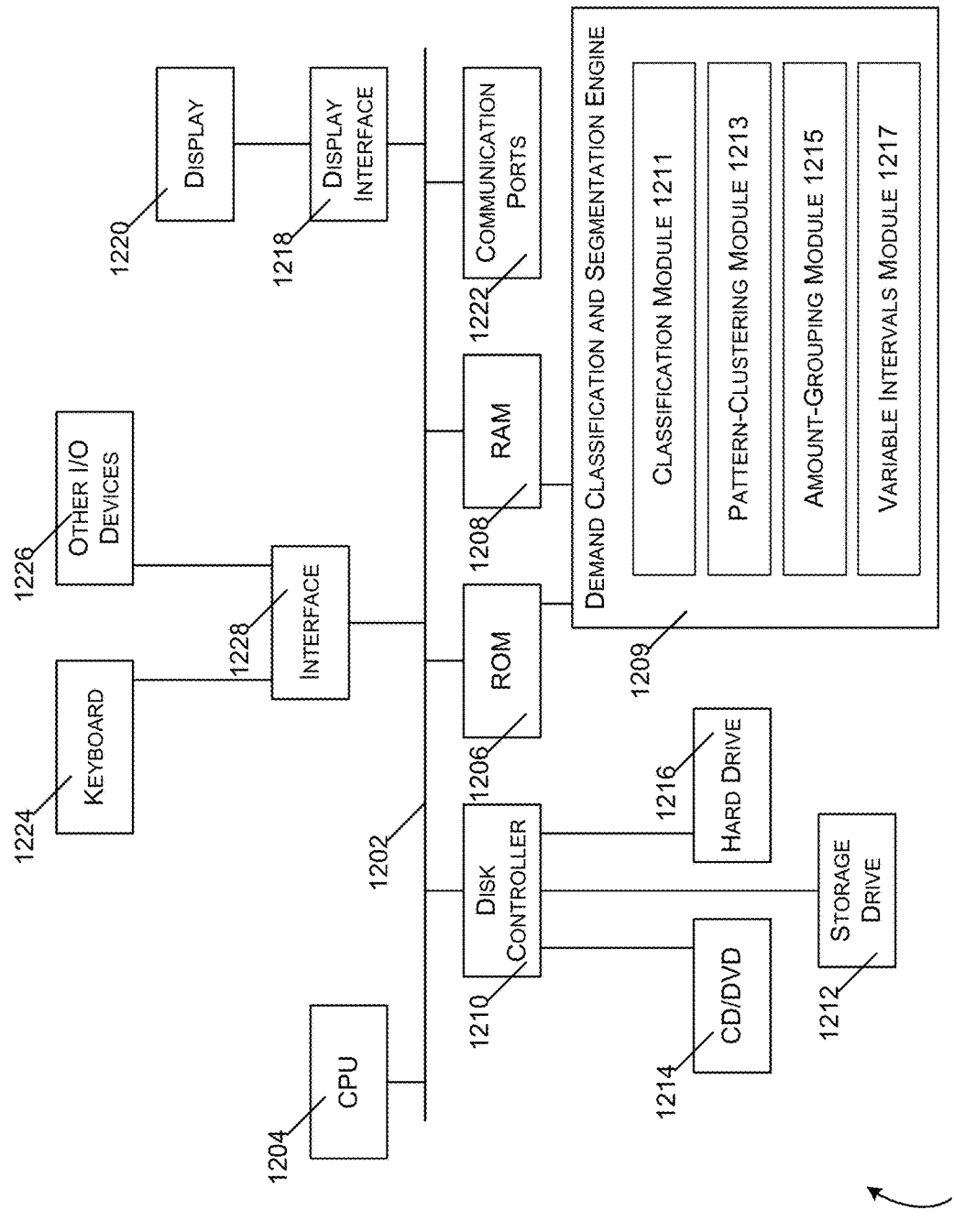
FIG. 12 illustrates a block diagram of an example of a processing system of FIG. 11 for classifying, clustering, and grouping, by a performance classification and segmentation (DCS) engine, one or more time series.

FIG. 12 illustrates a block diagram of an example of a processing system 1110 of FIG. 11 for analyzing one or more time series. A bus 1202 may interconnect the other illustrated components of processing system 1110. Central processing unit (CPU) 1204 (e.g., one or more computer processors) may perform calculations and logic operations used to execute a program. A processor-readable storage medium, such as read-only memory (ROM) 1206 and random access memory (RAM) 1208, may be in communication with the CPU 1204 and may contain one or more programming instructions. Optionally, program instructions may be stored on a computer-readable storage medium, such as a magnetic disk, optical disk, recordable memory device, flash memory, or other physical storage medium. Computer instructions may also be communicated via a communications transmission, data stream, or a modulated carrier wave. In one example, program instructions implementing Demand, Classification, and Segmentation engine (DCS engine) 1209, as described further in this description, may be stored on storage drive 1212, hard drive 1216, read only memory (ROM) 1206, random access memory (RAM) 1208, or may exist as a stand-alone service external to the stand-alone computer architecture. Some or all of the process described in relation to DCS engine 1209 may be performed under the control of one or more computer systems configured with specific computer-executable instructions and may be implemented as code (e.g., executable instructions, one or more computer programs or one or more applications) executing collectively on one or more processors, by hardware or combinations thereof. The code may be stored on a non-transitory computer-readable storage medium, for example, in the form of a computer program including a plurality of instructions executable by one or more processors. The computer-readable storage medium may be non-transitory.

DCS engine 1209 may include a number of modules (e.g., classification module 1211, pattern-clustering module 1213, and amount-grouping module 1215). These modules may be software modules, hardware modules, or a combination thereof. If the modules are software modules, the modules can be embodied on a computer-readable medium and processed by a processor in any of the computer systems described herein. It should be noted that any module or data store described herein, may be, in some embodiments, a service responsible for managing data of the type required to make corresponding calculations. The modules may exist within the DCS engine 1209 or may exist as separate modules or services external to the DCS engine 1209. These modules may be directed to performing operations of the DCS engine 1209 to accelerate the public need output prediction processes, resulting in improved computational performance of CPU 1204 during operations of predictive modeling.

A disk controller 1210 can interface one or more optional disk drives to the bus 1202. These disk drives may be external or internal floppy disk drives such as storage drive 1212, external or internal CD-ROM, CD-R, CD-RW, or DVD drives 1214, or external or internal hard drive 1216. As indicated previously, these various disk drives and disk controllers are optional devices.

A display interface 1218 may permit information from the bus 1202 to be displayed on a display 1220 in audio, graphic, or alphanumeric format. Communication with external devices may optionally occur using various communication ports 1222. In addition to the standard computer-type components, the hardware may also include data input devices, such as a keyboard 1224, or other input/output devices 1226, such as a microphone, remote control, touchpad, keypad, stylus, motion, or gesture sensor, location sensor, still or video camera, pointer, mouse or joystick, which can obtain information from bus 1202 via interface 1228.

DCS Engine Overview

The DCS engine (e.g., the DCS engine 1209) can include at least three modules: a classification module (e.g., classification module 1211), a pattern-clustering module (e.g., pattern-clustering module 1213), and an amount-grouping module (e.g., amount-grouping module 1215).

Classification Module

The classification module 1211 can classify each performance time series based on characteristics such as performance lifecycle, intermittence, and seasonality. A "performance time series," as used herein, is intended to refer to a time series in which data points represent a degree of performance of an offered item. The classification results (e.g., performance time series statistics) can be output to users to enable the users to apply appropriate modeling techniques to each performance time series.

For example, regular items and specific day items are usually stored in the same area since they are all similar and have a relationship, but should be put into different areas when modeled because regular items is a long time-span item that has high performance throughout time. When modeled, it may be possible to learn the success of the items throughout time and their relationships with each other. In contrast, specific day items are short time-span item that is typically offered only around a specific time, so when modeled, the user is likely interested in focusing on a short period of time and is likely only interested in selecting a prediction technique that is more suitable for time series having a short performance time period. Classifying such items into different segments ensures that suitable factors are considered when modeling the performance for the item.

Pattern-Clustering Module

The pattern-clustering module (e.g., the pattern-clustering module 1213) groups the time series into different clusters based on similar public need output patterns over time periods as well as public need output characteristics for each public need output class generated from the classification module 1211. The cluster defines each aggregate series and establishes the prediction hierarchy so that each aggregated series may be a good representation of its child series.

For example, winter apparels (e.g., jackets) and summer apparels (swimsuits) are both short time-span items, but may have different public need output patterns. A combined prediction approach for apparels might result in summer performance predictions for winter wear items and winter performance predictions for the swimming gear. Clustering such items separately, however, may ensure that the public need output predictions for the appropriate seasons are considered.

Amount-Grouping Module

Public need output amounts at lower levels in the hierarchy might be insufficient to generate accurate predictions due to a low signal-to-noise ratio (SNR). In general, this type of grouping enables users to set a threshold level to generate collective performance, establish optimal reconciliation levels, and calibrate prediction models to generate reliable predictions. The amount-grouping module 1215 may reduce noise at lower levels in the hierarchy, so that robust public need output signals can be obtained.

Overall Process Flow

Figure 13:
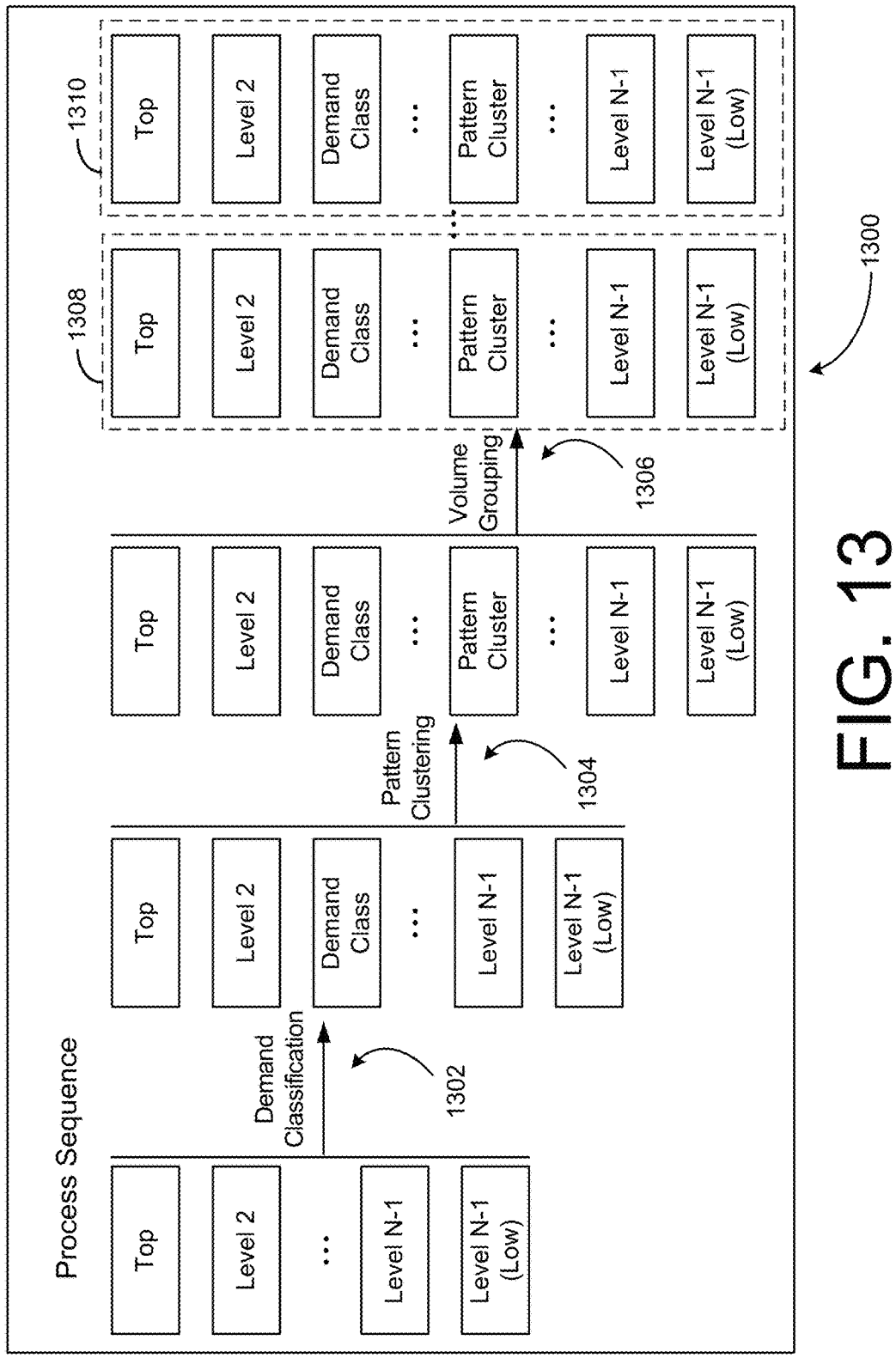
FIG. 13 illustrates an example of a block diagram of a process sequence for classifying, clustering, and hierarchical grouping one or more time series.

FIG. 13 illustrates an example of a block diagram 1300 of a process sequence for classifying, clustering, and hierarchical grouping one or more time series.

At 1302, the classification module (e.g., the classification module 1211 of the DCS engine 1209) may classify each time series at specified level(s) into different classes, generate statistics of each of the demand series, and derive information about the demand (i.e. public need output) characteristics for the time series.

After the public need output classes are ascertained for a time series, the pattern-clustering process can be executed for each class of time series at 1304. The pattern-clustering module (e.g., the pattern-clustering module 1213 of the DCS engine 1209) may generate a pattern attribute that is used to cluster the demand series. Demand series with the same, or similar, demand characteristic may be grouped together and clusters may be formed.

Amount group 1308 and amount group 1310 may be generated at 1306 within the scope defined by the classification module 1211 and the pattern-clustering module 1213. In at least one embodiment, each amount group may be a group of nodes where the amount of an expected output satisfies a minimum threshold. The amount-grouping module groups time series data with the same prediction reconciliation levels.

Classification Module

The classification module (e.g., the classification module 1211 of DCS engine 1209) may classify each time series at a specified level or levels into different classes as well as generate public need output specific statistics of each time series. The purpose of public need output classification is to provide information about each time series that will help in choosing the appropriate prediction technique.

The classification of a time series may be important because different prediction techniques might be applied to different types of individual time series to improve prediction accuracy. For example, if a time series is known to be an intermittent time series, applying intermittent prediction techniques may produce more accurate prediction than selecting some other time series model (e.g., ARIMA). In addition, among all the intermittent prediction techniques, some may be better suited to one time series over another. Ascertaining information about the time series by the classification module 1211 may enable the classification module 1211 to utilize the most suitable technique for prediction the time series.

Public Need Output Classification Overview

Figure 14:
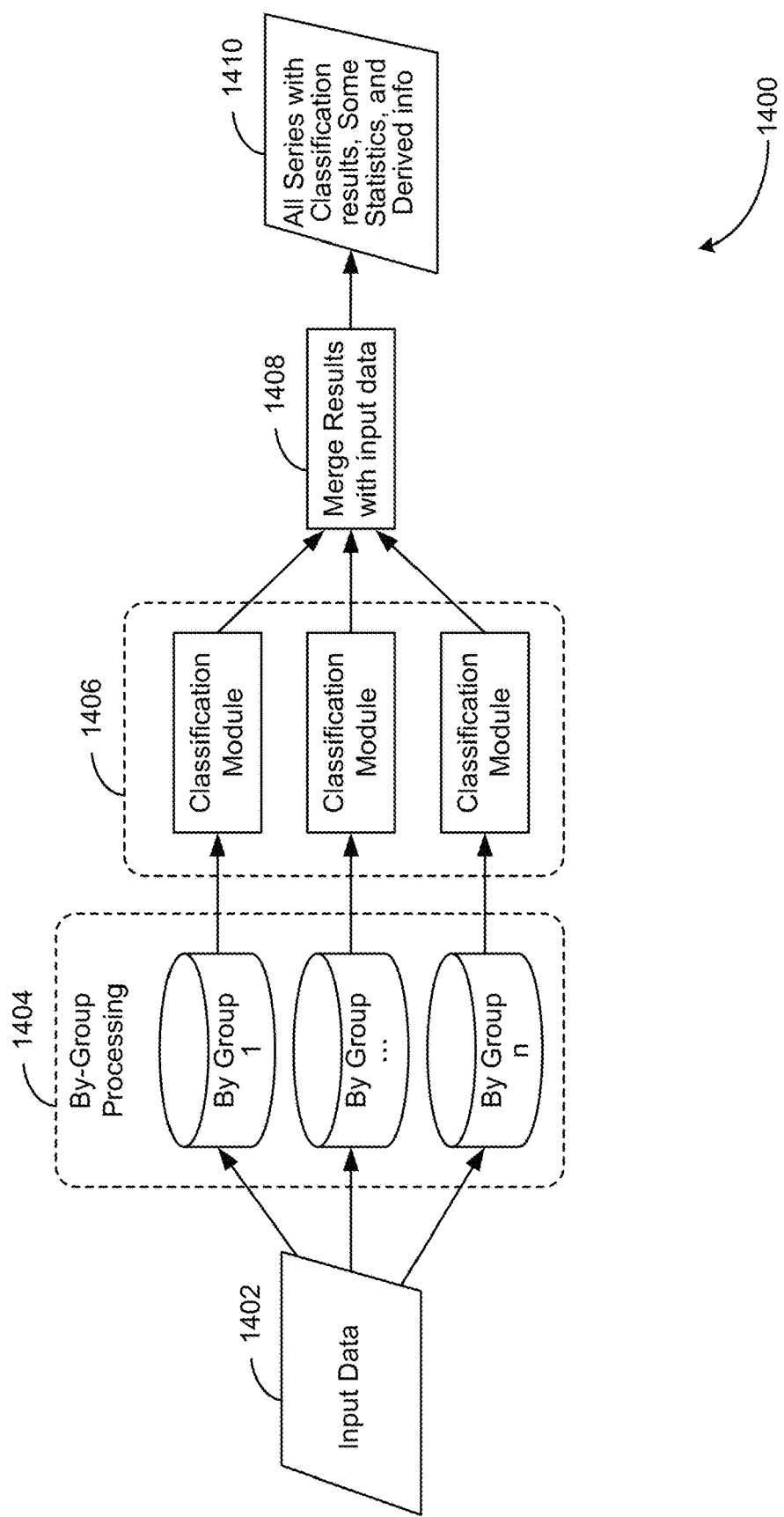
FIG. 14 illustrates an example of a block diagram of a process for performance classification.

FIG. 14 illustrates an example of a block diagram 1400 of a process for demand (i.e. public need output) classification.

Classification module 1211 can take time series information, hierarchical information, and configuration information as input at 1402. At 1404, classification module 1211 may process the time series using a user-defined class-by-variable. At 1406, the classification module 1211 can produce outputs for each group including, but not limited to, the classification results, public need output specific statistics, and the derived information based on a user's selection. Classification module 1211 may merge the outputs with the original input data at 1408. At 1410, potentially each time series may be assigned preliminary classification results, time series statistics, and derived information related to the time series.

Figure 15:
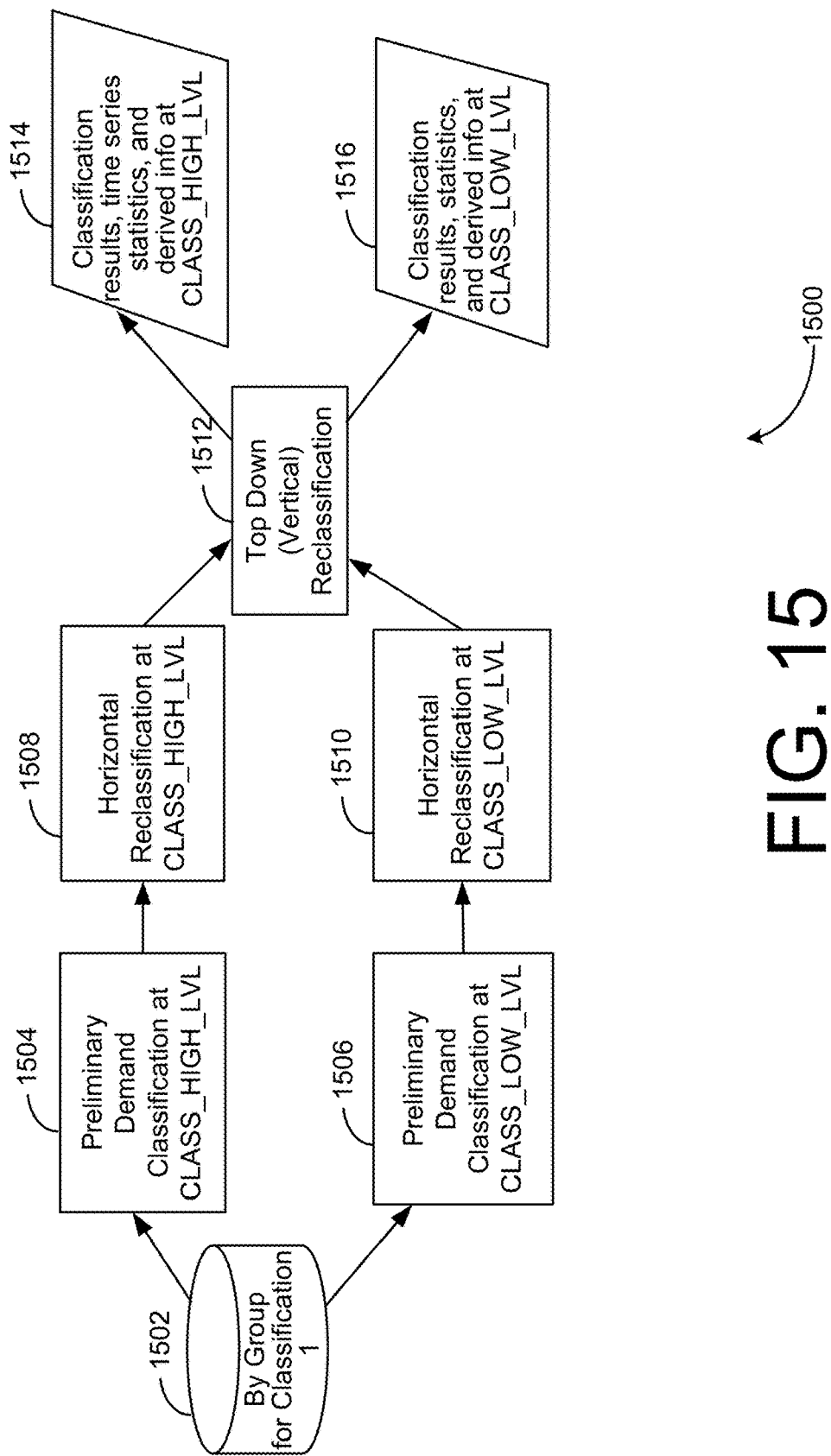
FIG. 15 illustrates an additional example of a block diagram of a process for performance classification.

FIG. 15 illustrates an additional example of a block diagram 1500 of a process for public need output classification. At 1502, a classification module 1211 may first take input information to conduct a preliminary public need output classification at a user-defined CLASS_HIGH level at 1504 and a CLASS_LOW level at 1506, respectively. The preliminary classification results, statistics, and derived information may be produced for each level at 1504 and 1506, respectively. Based on each preliminary classification result, horizontal reclassification for time series that cannot be classified due to a lack of history may be performed at each level to generate intermediate classification results at 1508 and 1510, respectively. With the intermediate classification results at both levels, Top-down (Vertical) Reclassification that combines both the parent and child series characteristics can be optionally performed at 1512. In at least one example, top-down (vertical) reclassification may be specified by the user. The classification results may become the final classification results for CLASS_HIGH level and CLASS_LOW level at 1514 and 1516, respectively.

The public need output classification process may have various class types that can be considered. For example, class types may include, but are not limited to, one of a short-history classification (SHORT), a low-volume classification (LOW_VOLUME), a short time-span non-intermittent classification (STS_NON_INTERMIT), a short time-span intermittent classification (STS_INTERMIT), a long time-span seasonal classification (LTS_SEASON), a long time-span non-seasonal classification (LTS_NON_SEASON), a long time-span intermittent classification (LTS_INTERMIT), a long time-span seasonal intermittent classification (LTS_SEASON), an optional long time-span unclassifiable classification (LTS_UNCLASS), an optional unclassified classification (UNCLASS), or an inactive classification (INACTIVE).

Figure 16:
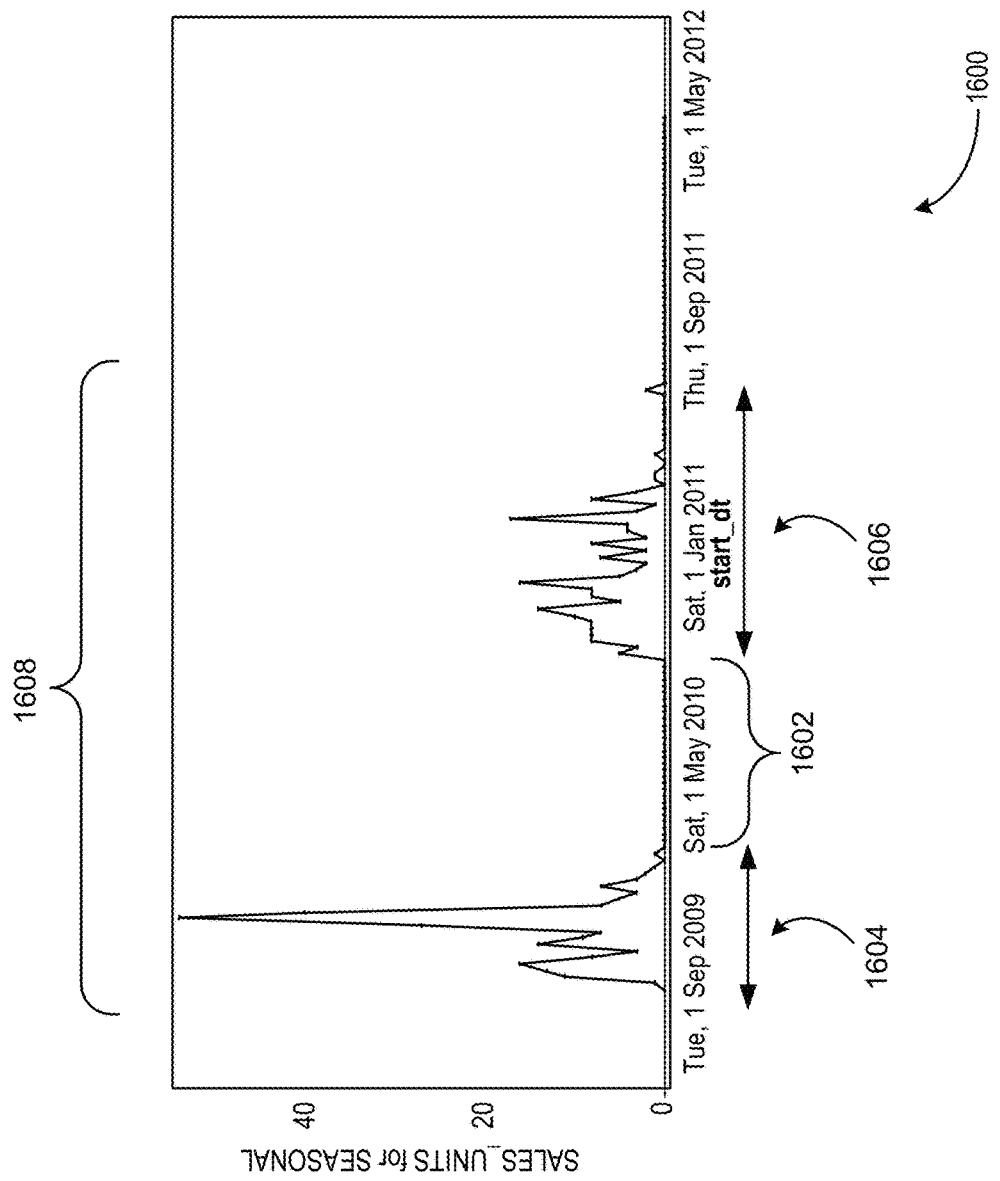
FIG. 16 illustrates diagram chart with examples of components of a time series.

FIG. 16 illustrates diagram chart 1600 with examples of components of a time series. Low-demand time period 1602 is identified. Low-demand time period 1602 is a time period during which demand under some threshold may be considered no need for the purpose of analysis. Cycle 1604 and cycle 1606 each indicate a period for which public need output is above the threshold amount. In at least one example, the threshold amount is user-specified (e.g., an absolute value) or determined based on a user specified value (e.g., a specified percentage). A time series 1608 may be analyzed to determine whether public need output gaps, such as low-demand time period 1602, exist within the time series 1608. By identifying low-demand time period 1602, cycle 1604 and cycle 1606 may be identifiable. Based on the length of the cycle 1604 and cycle 1606, the time series 1608 may be assigned a class type (e.g., "Long Time Span" series or "Short Time Span" series). By analyzing cycle 1604 and cycle 1606, characteristics such as time period of year or intermittency may be determined enabling further classification of the time series. Thus, a preliminary classification for the time series may be determined. Note that any of cycles 1604 or 1606 may be demand/public need output cycles.

Figure 17:
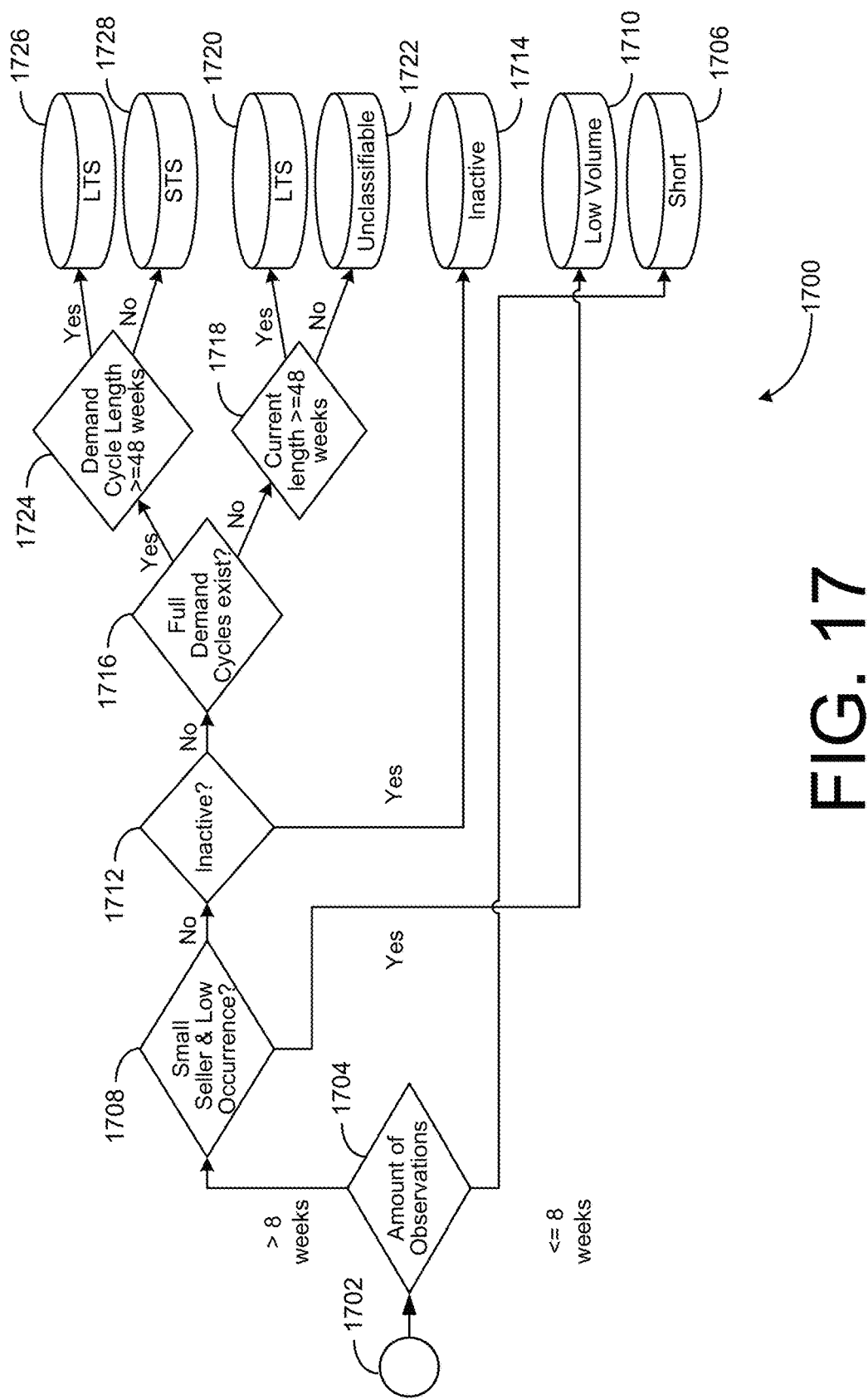
FIG. 17 illustrates an example of a flow diagram for classifying a time series.
Figure 18:
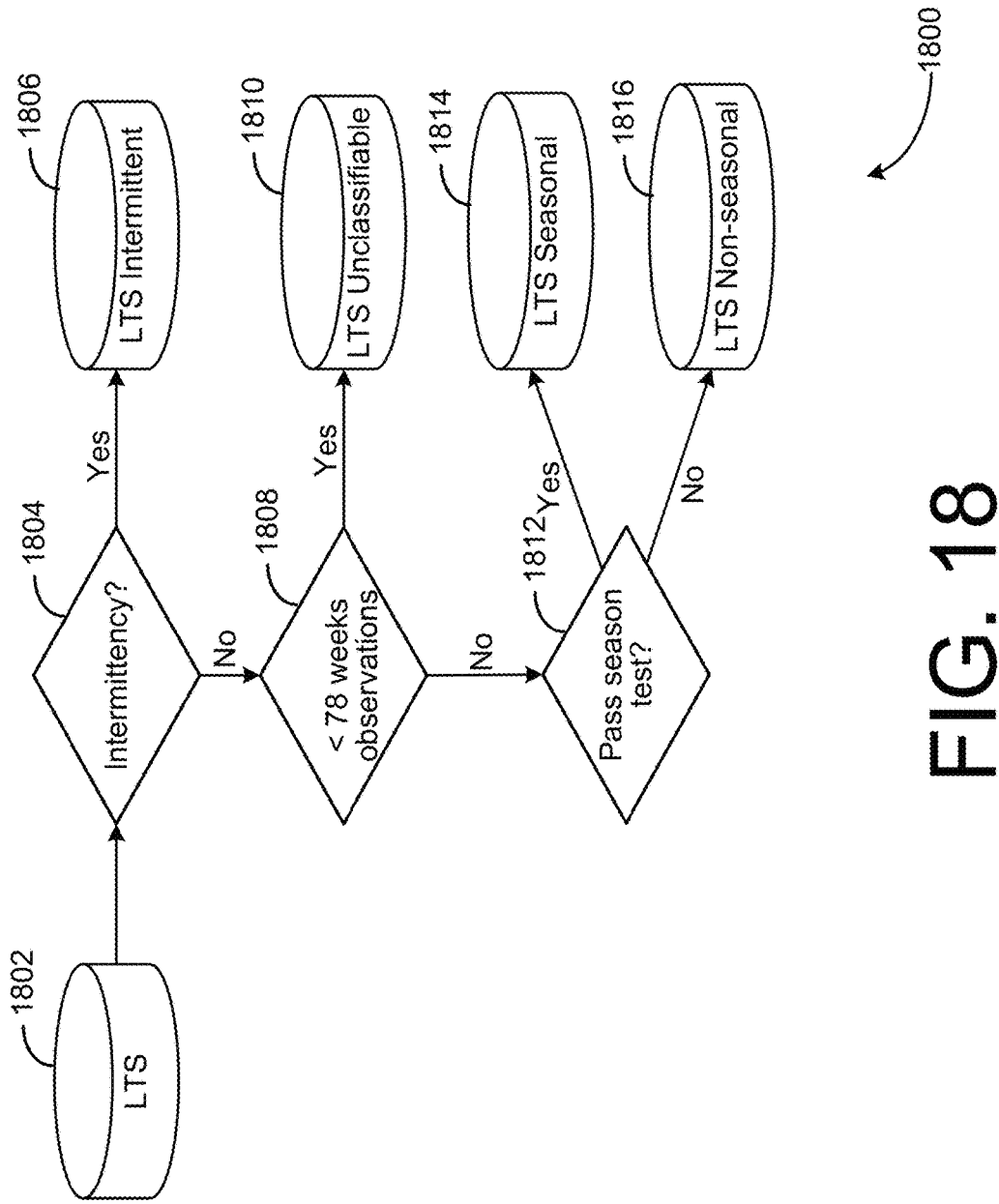
FIG. 18 illustrates an additional example of a flow diagram for classifying a time series.
Figure 19:
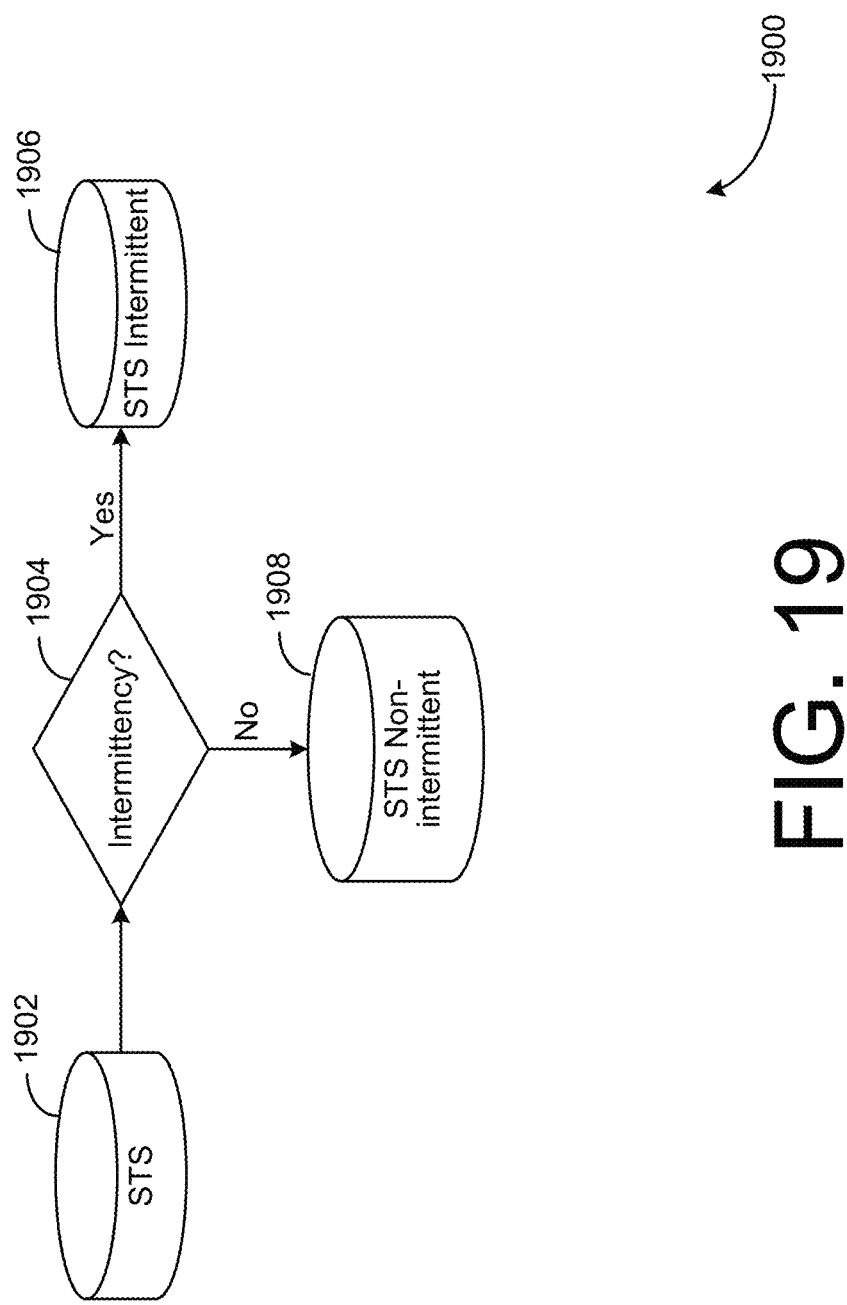
FIG. 19 illustrates a further example of a flow diagram for classifying a time series.

FIGS. 17-19 are illustrations of the classification logic included in the classification module of a DCS engine (e.g., the classification module 1211 of the DCS engine 1209).

FIG. 17 illustrates an example of a flow diagram 1700 for classifying an individual time series. The flow may begin at 1702, where an individual time series may be received by, for example, classification module 1211. At decision block 1704, an amount of observations for the time series may be determined. If the amount of observations is determined to be less than eight weeks, the individual time series may be classified as a short-history classification at block 1706. Though this example uses the example of eight weeks, the amount of observations for the time series may be any suitable period of time. If the amount of observations is determined to be greater than eight weeks at block 1704, then the flow may proceed to decision block 1708.

At decision block 1708, classification module 1211 may determine whether the offeror (e.g. business) is small and the occurrence is low as compared to a user-specified threshold value. If the offeror is small and there is low occurrence, then the individual time series may be classified as a low-volume classification at block 1710. If the offeror is not small and there is not a low occurrence, then the flow may continue to decision block 1712.

At decision block 1712, classification module 1211 may determine whether or not the time series is inactive based on a user-specified threshold. If the time series is inactive, then classification module 1211 may classify the time series as an inactive classification at block 1714. If the time series is not inactive, then the process may continue to decision block 1716.

At decision block 1716, classification module 1211 may determine whether or not the individual time series has full public need output cycles. A full public need output cycle is a period during which the items are offered and may either be followed by a gap period, or a long inactive period. If the time series does not have full public need output cycles, then the flow may proceed to decision block 1718. At decision block 1718, classification module 1211 may determine the length of the current cycle (e.g., by comparing a current time to a latest public need output period start). For example, if the latest public need output period starts at week 10, and the current time is week 20, then the length of the current cycle is 10. If the length of the current cycle is greater than or equal to 48 weeks, then the classification module 1211 may preliminarily classy the time series as a "Long Time-Span" time series at block 1720. If the length of the current cycle is less than 48 weeks, then the time series may be classified as "Unclassifiable" at block 1722. Though this example uses the example of forty-eight weeks as a threshold value, such a threshold may be any suitable period of time.

If the data set does have full public need output cycles at decision block 1716, then the process may proceed to decision block 1724. At decision block 1724, classification module 1211 may determine a maximum public need output cycle length. A maximum public need output cycle length may be determined by computing the length of all full public need output cycles followed by selecting the maximum of the computed lengths. If the length of the public need output cycle is greater or equal to 48 weeks, or another suitable period of time, then the classification module 1211 may classify the time series as a "Long Time-Span" time series at block 1726. If the length of the current public need output cycle is less than 48 weeks, or another suitable period of time, then the time series may be classified as "Short Time-Span" at block 1726.

FIG. 18 illustrates an example of a flow diagram 1800 for classifying a Long Time-Span (LTS) time series. The flow may begin at 1802, where a time series having a "Long Time-Span" classification may be obtained, for example, by classification module 1211. At decision block 1804, classification module 1211 may determine whether or not the LTS time series is intermittent. Intermittency may be determined based on all non-gap periods and a user-specified threshold. If the LTS series is intermittent, classification module 1211 may classify the time series as a "Long Time-Span Intermittent" time series at block 1806. If the LTS series is not intermittent, then the flow may proceed to decision block 1808.

At decision block 1808, classification module 1211 may determine a length of time over which observations are included in the time series. If the number of observations spans less than, for example, 78 weeks, then classification module 1211 may preliminarily classify the time series as a "Long Time-Span Unclassified" time series at block 1810. If the number of observations spans less than at least, for example, 78 weeks or more, then the flow may proceed to decision block 1812. Though 78 weeks is given as an example, it should be noted that any suitable period of time may be similarly utilized.

At decision block 1812, classification module 1211 may determine whether or not the time series passes a test (e.g., SAS standard season test). If the time series passes the test, then the time series may be classified as a "Long Time-Span Seasonal" time series at block 1814. If the time series does not pass the test, then classification module 1211 may classy the time series as a "Long Time-Span Non-Seasonal" time series at block 1816.

FIG. 19 illustrates an example of a flow diagram 1900 for classifying a "Short Time-Span" (STS) time series. The flow may begin at 1902, where a data set having a "Short Time-Span" classification may be obtained by classification module 1211. At decision block 1904, classification module 1211 may determine whether or not the STS time series is intermittent. As stated above, intermittency may be determined based on all non-gap periods and a user-specified threshold. If classification module 1211 determine that the STS time series is intermittent, then the data set may be classified as a "Short Time-Span Intermittent" time series at block 1906. If classification module 1211 determines that the LTS time series is not intermittent, then the time series may be classified as a "Short Time-Span Non-Intermittent" time series at block 1908.

Horizontal Reclassification

Figure 20:
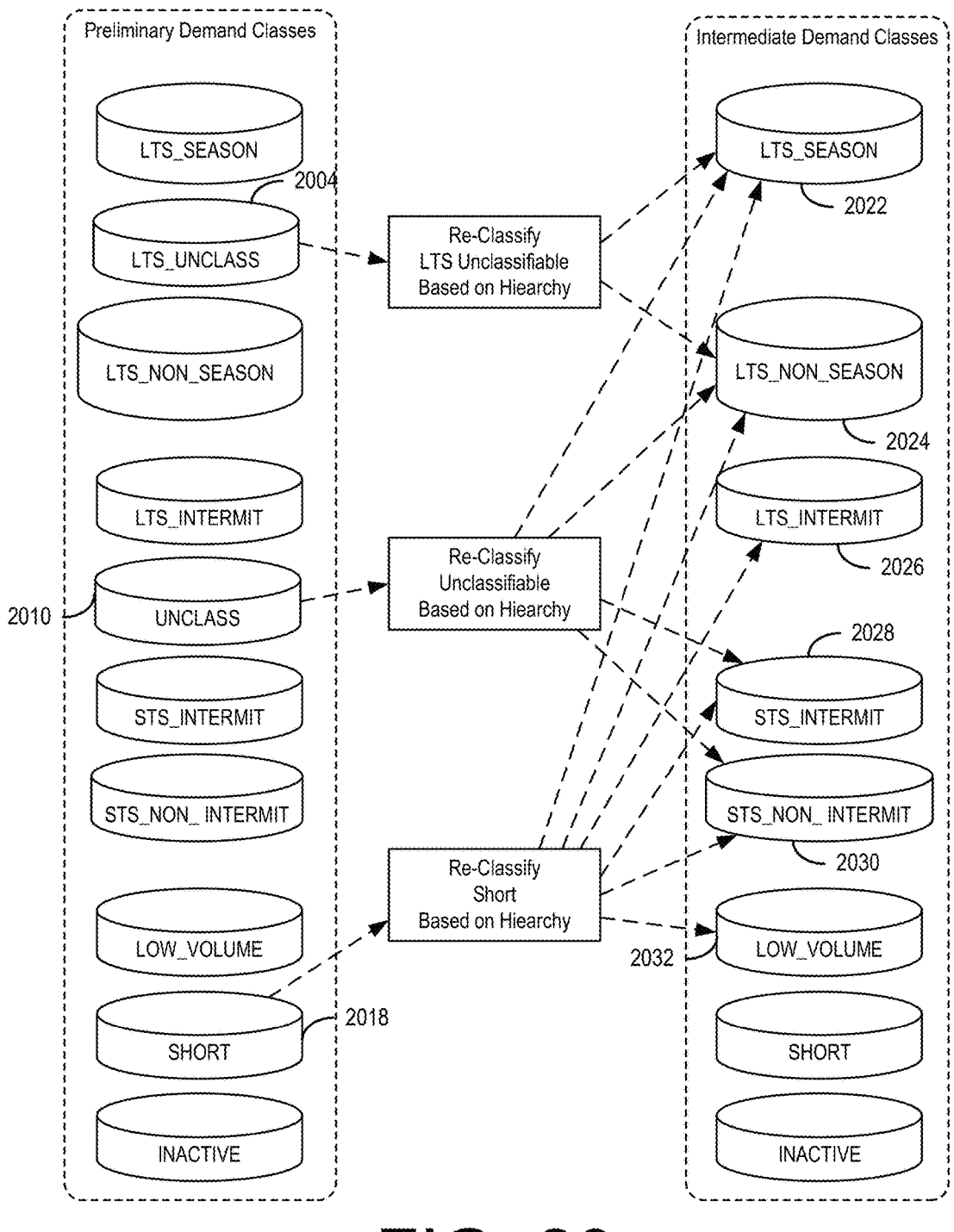
FIG. 20 illustrates an example of a block diagram for horizontally reclassifying one or more time series.

FIG. 20 illustrates an example block diagram 2000 for horizontally reclassifying a time series. Some time series may be difficult to classify due to lack of history, for example, it may be impossible to determine if a "long time-span" time series is seasonal or non-seasonal based on only 56 weeks of data. In this case, classification module 1211 may classify the time series as an "Unclassifiable" series and then re-classify the time series by analyzing information from the time series' sibling time series in the hierarchy.

As shown in FIG. 20, LTS_UNCLASS classification 2004, UNCLASS classification 2010 and SHORT classification 2018 can be optionally reclassified using horizontal reclassification. LTS_UNCLASS classification 2004 can be optionally reclassified as either LTS_SEASON classification 2022 or LTS_NON_SEASON classification 2024. UNCLASS classification 2010 can be reclassified as one type among LTS_SEASON classification 2022, LTS_NON_SEASON classification 2024, LTS_INTERMIT classification 2026, STS_INTERMIT classification 2028, and STS_NON_INTERMIT classification 2030. SHORT classification 2018 can be reclassified as one type among LTS_SEASON classification 2022, LTS_NON_SEASON classification 2024, LTS_INTERMIT classification 2026, STS_INTERMIT classification 2028, STS_NON_INTERMIT classification 2030, or LOW_VOLUME classification 2032.

Top-Down Reclassification

For "Long Time-Span" time series with a characteristic of intermittency, it may be difficult to whether or not the time series is seasonal (or other characteristics) because of the sparseness of the observations. This is where Top-down Reclassification may be utilized. The characteristic information from the hierarchy can be used, but instead of analyzing sibling series, which could all be intermittent, the usually less-sparse parent series may be analyzed. If a characteristic applies to the parent series, then the child series may also be considered to have that characteristic.

To be more specific, the reclassification may be done solely at CLASS_LOW level based on the intermediate classification results for both the CLASS_LOW and CLASS_HIGH level. If the parent series at the CLASS_HIGH level has been classified as LTS_SEASON, and the child series at the CLASS_LOW level has been classified as LTS_INTERMIT, then the Top-down Reclassification may reclassify the CLASS_LOW level child series as LTS_SEASON_INTERMIT.

Pattern-Clustering Module

The pattern-clustering module (e.g., the pattern-clustering module 1213 of DCS engine 1209) may group public need output series based on public need output patterns such as year-over-year monthly public need output proportions, a monthly public need output average, or parameter estimates based on ARIMA models. Pattern groups can be used in building a prediction hierarchy and improve prediction accuracy.

For example, winter clothes and summer swimming suits can both be short time-span items, but these items may have different public need output patterns. Predicting these items together may lead to inaccuracies due to the differing public need output patterns. Predicting the items separately, however, can ensure that the correct characteristics are considered.

In at least one example, public need output series with similar patterns may be clustered together for each "long time-span seasonal" and "short time-span" time series. Various techniques can be used for clustering. For example, hierarchical clustering, K-means clustering, or a combination of the two may be used to cluster public need output series with other time series having the same, or similar, public need output patterns.

Hierarchical clustering can automatically determine an optimal number of clusters. However, hierarchical clustering may produce performance issues especially when the number of items to cluster exceeds a certain limit. K-means methods are computationally efficient. However, K-means methods may involve having to pre-specify a number of clusters. Thus, a hybrid process may be considered that combines the two methods to make use of the advantages of each method.

In at least one example, pattern-clustering module 1213 may utilize a k-means algorithm to generate an initial set of clusters. A hierarchical clustering algorithm may be used on the cluster centers generated from the k-means algorithm to determine an optimal number of clusters. Pattern clustering module 1213 may execute the k-means algorithm with the original data as input, using the optimal number of clusters as determined by the hierarchical clustering algorithm.

The pattern-clustering module 1213 can separate short time-span items with different time periods of performance. Additionally, the pattern-clustering module 1213 may identify key features to be considered in the model.

Figure 21:
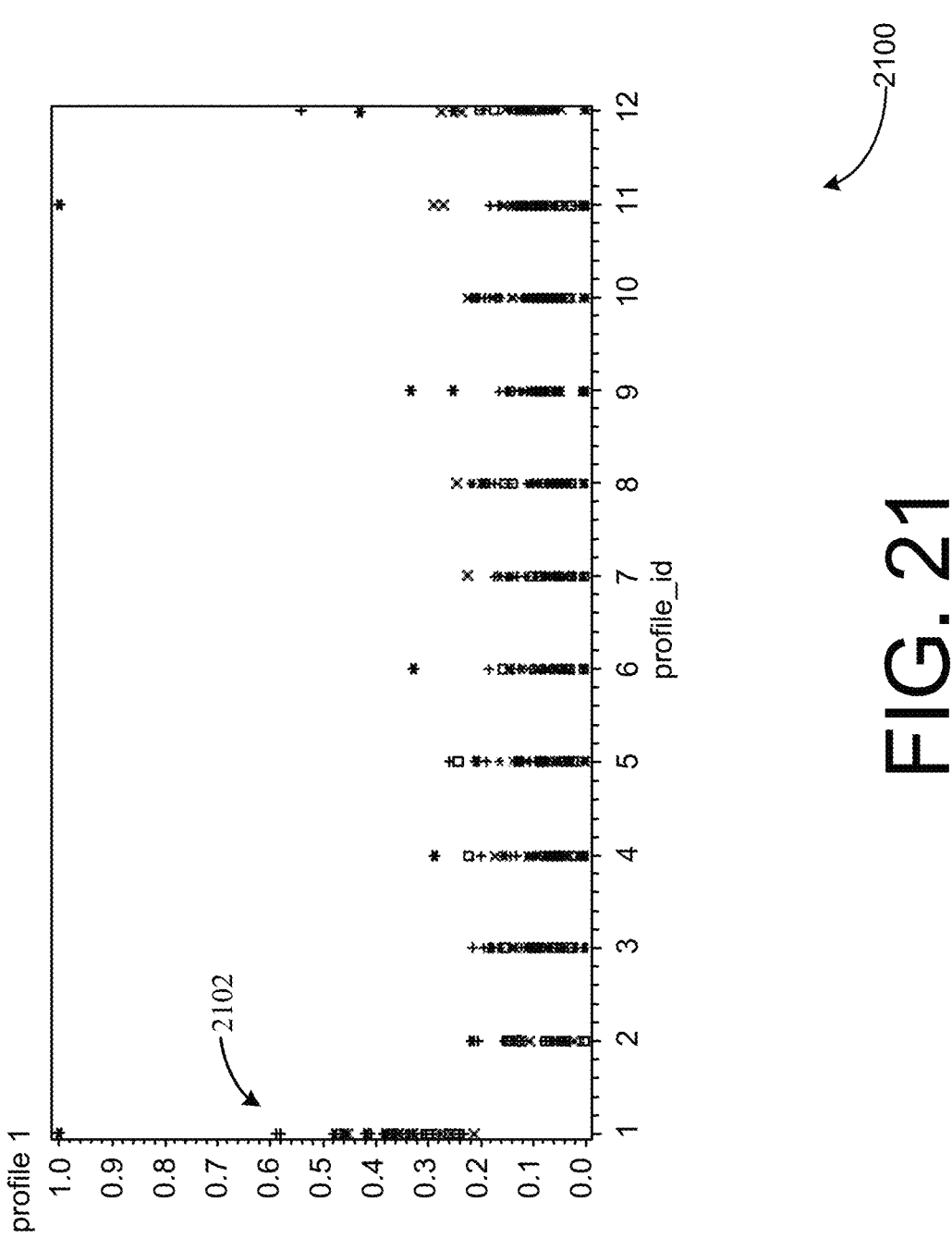
FIG. 21 illustrates an example of a time series having a performance peak.
Figure 22:
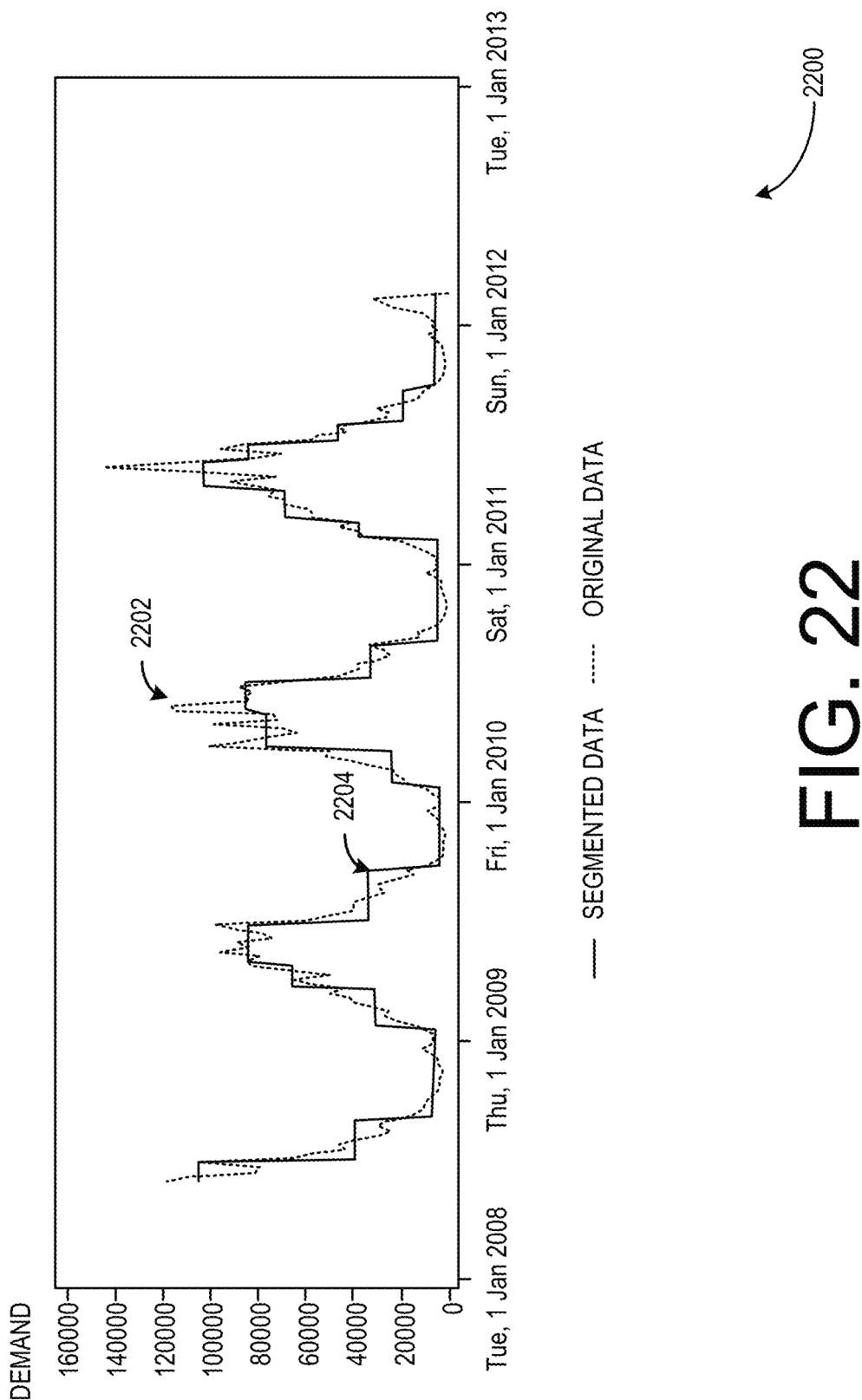
FIG. 22 illustrates an example of a segmented time series.

For example, if pattern-clustering results in 14 clusters, among all clusters, 12 clusters reveal public need output peaks in 12 different months, from January to December. FIG. 21 illustrates a series having a peak 2102 which occurs, for example, in January. Though the month of January is utilized in FIG. 21, any month of the year, or any suitable period may be utilized. A peak illustrates when an item may be most desirable or needed, or, in other words the peak illustrates when the best performance of the item have occurred.

User Variable Intervals

Traditional prediction algorithms uses standard time intervals that often do not work well with time series data having many inactive periods (e.g. that are highly dependent upon time of year). For example, an Easter toy may only have good performance during a particular time of year, where the precise dates may shift, making predictions difficult to ascertain. Techniques that require a user to define an interval for the event (e.g., the time before and after a day for which the item will be offered because of high performance) are cumbersome and may produce inaccurate predictions. Identifying a user-variable interval of the event or a time period within the time series from the time series data can produce more accurate predictions. Additionally, predicting upcoming (i.e. future) event intervals or time period intervals based on user-variable intervals can be more efficient and more accurate than requiring user-defined intervals.

User Variable (or, for example, custom) intervals may be determined by a separate variable intervals module 1217, or by any of the modules discussed herein. A module responsible for determining user variable intervals for the public need output in a time series may be part of a DCS engine (e.g., the DCS engine 1209) or a component separate from the DCS engine.

Variable intervals module 1217, or alternatively, classification module 1211, may identify public need output gaps in the time series. Demand classification (or public need output classification), discussed above, can be used to identify public need output gaps. For example, consecutive low public need with a length exceeding some threshold (e.g., 1 week) may be identified as a public need gap. The identified public need gaps may be used to determine public need output cycles (e.g., periods for which public need is over a threshold amount for a threshold period of time). Once public need output cycles are determined, the time series may be classified (e.g., by variable intervals module 1217 or classification module 1211) as one of the classifications discussed above.

User variable intervals module 1217, or alternatively, pattern-clustering module 1213, may cluster time series having the same, or similar, public need output classifications together. Through clustering similar items with the same, or similar, time period pattern together, a stronger time period signal may be obtained. A stronger time period signal can result in more accurate user variable intervals. Any suitable collection technique may be utilized, for example, the pattern-clustering algorithm discussed above in connection with the pattern-clustering module 1213.

Figure 24:
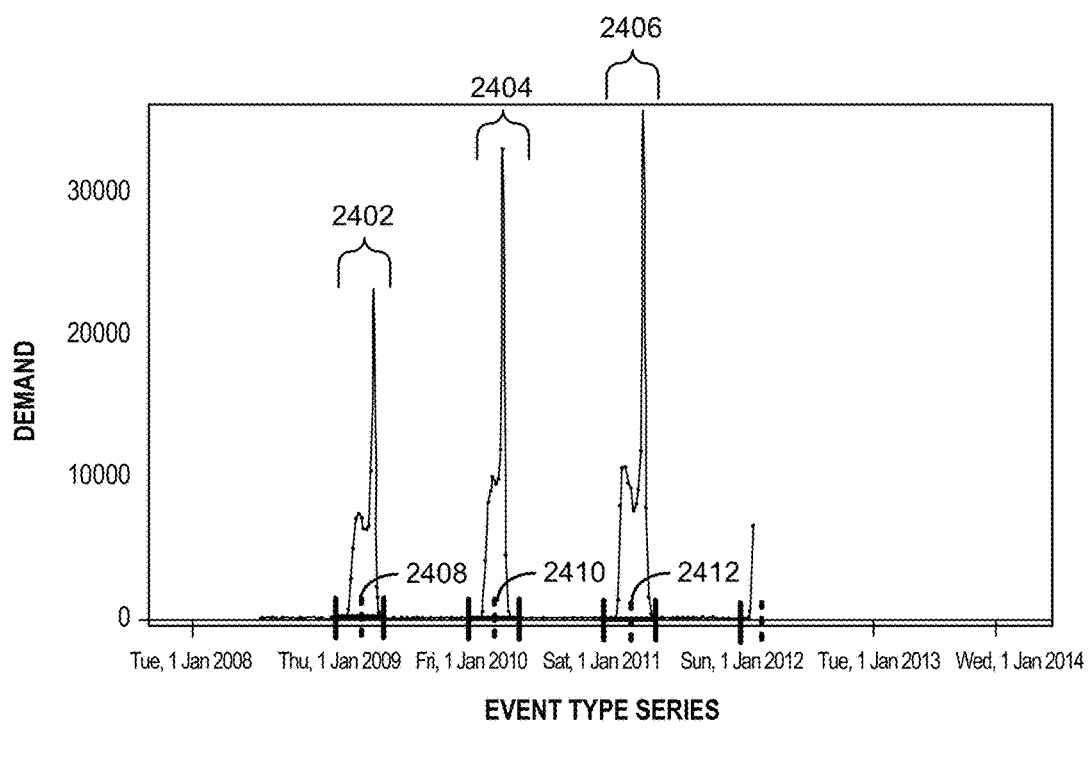
FIG. 24 illustrates an example of an example of an event-type time series.

A process utilized by user variable intervals module 1217 for determining user variable intervals may first begin with identifying public need output gaps of the time series, or alternatively, of the aggregated time series. Public need output classification, as discussed herein, may be utilized to identify such public need output gaps. Alternatively, a time series segmentation or representation algorithm may be used to first approximate the time series. A time series can be represented as a sequence of individual segments, each with its own characteristic properties. A time series segmentation algorithm may be utilized by variable intervals module 1217 to split the time-series into a sequence of such segments. FIG. 24 illustrates an example of a segmented time series, where dotted line 2402 illustrates the original time series data and solid line 2404 illustrates the segments of the time series. "Segments," as used herein, is intended to refer to an approximation of the original time series data over a given period of time. Public need output gaps, and corresponding public need output cycles, may then be determined from the segments of the time series in a similar manner as described above.

Figure 23:
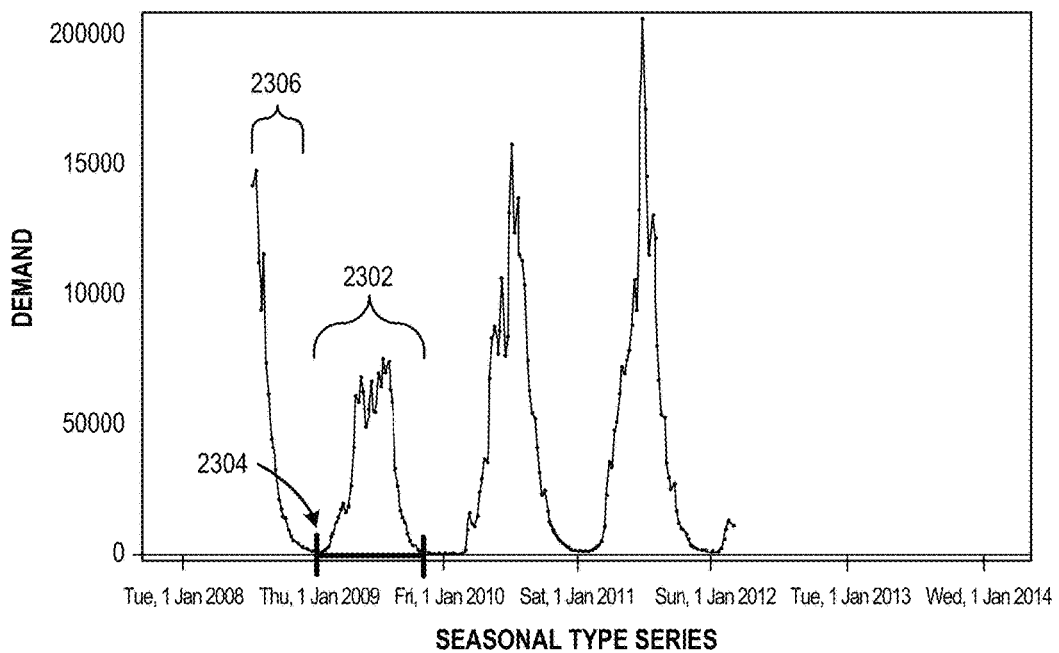
FIG. 23 illustrates an example of a seasonal-type time series.

In at least one embodiment, the identified public need output cycles may be classified as "event" or "seasonal" or "time period" (e.g., by variable intervals module 1217 or classification module 1211) For example, if the mean public need output cycle is larger than a time period threshold (e.g., 4 weeks) than the time series may be classified as "seasonal." Alternatively, if an event (e.g., a holiday) occurs during the public need output cycle, then the time series may be classified as "event." FIG. 23 illustrates an example of a season type time series. Public need output cycle 2302 is indicative of a season-type time series because the public need output cycle 2302 is greater than a threshold length. Data point 2304 may indicate the start of the season-type time series because the public need output at data point 2304 is substantially zero, with a period of increasing public need output occurring immediately thereafter. Public need output cycle portion 2306 may indicate a portion of a previous public need output cycle (previous with respect to public need output cycle 2302), because public need output cycle portion 2306 begins with a non-zero value. A season-type threshold length may be pre-defined and may be defined as any length of time. FIG. 24 illustrates an example of an event-type time series. Public need output cycles 2402, 2404, and 2406 are indicative of an event type time series because the public need output cycles 2402, 2404, and 2406 are less than a threshold length. Additionally, event 2408 occurs during public need output cycle 2404, further indicating an event type time series. Similarly event 2410 and event 2412 occur during public need output cycles 2404 and 2406, respectively, further indicating an event type time series. Though the public need output in FIG. 24 appear to be substantially the same length, it should be noted that the public need output cycles may be the same, similar, or different lengths, each of which are less than a threshold length.

In one example, variable intervals module 1217 may modify the public need output cycle periods so that each public need output cycle length is substantially the same. For example, public need output cycles 2402, 2404, and 2406, may be analyzed to calculate a variable interval. Various methods determining a variable interval may be employed. For example, a user may select an interval rule that governs the manner in which the variable interval may be determined. Example interval rules may include, but are not limited to, a minimum interval rule, a maximum interval rule, a mean interval rule, and a mode interval rule. Applying a minimum rule may result in a variable interval length that is less than a variable interval length determined by application of a maximum rule. For example, over the course of several years, an event type time series may indicate that each time an event occurs, the public need output cycle for such events are, for example, at least three weeks long, and, for example, at most six weeks long. In this case, applying a minimum interval rule may result in upcoming intervals being customized to three weeks long, while applying a maximum rule may result in upcoming event intervals being customized to six weeks long. Similarly, a mean rule and a mode rule may analyze event occurrences in the event type time series and determine a variable interval length based on the mean length of event cycles in the time series, or a mode length of event cycles in the time series, respectively. In some embodiments, the interval rule used to calculate the variable interval length may be pre-specified.

Variable intervals module 1217 may also apply Interval rules in a similar manner to seasonal-type time series to determine a time period length. For example, a time series may indicate that a time period typically starts on the week ten of a year and lasts at least sixteen weeks and at most twenty weeks. Application of a minimum interval rule may result in a variable interval of sixteen weeks. Application of a maximum interval rule may result in a variable interval of twenty weeks. The mean interval length over the course of the time series may be twelve weeks. Application of the mean interval rule may result in a variable interval of twelve weeks. The length of time period occurring most often (e.g., a mode interval length) may be, for example, thirteen weeks. Thus, application of the mode interval rule may result in a variable interval of thirteen weeks.

In some cases, a time series may include an incomplete public need output cycle. For example, Public need output cycle portion 2306 of FIG. 23 illustrates a public need output cycle that is incomplete. Public need output cycles that are incomplete do not start with leading public need outputs higher than a particular threshold (e.g., zero). In some cases, variable intervals module 1217 may exclude incomplete public need output cycles from variable interval analysis since the inclusion of these cycles may skew variable interval calculations.

Determined user variable intervals may be used to predict an event or time period. For example, having determined a user variable interval of three weeks for an event (e.g., Easter, Apr. 20, 2014), an expected output cycle for a similar event may be calculated based on identifying the day on which the event occurs (e.g., Easter, Apr. 5, 2015). Similarly, having determined a user variable interval of sixteen weeks for a time period (e.g., summer 2014) and a start index for the time period (e.g., typically week 26), cycles for the time period may be predicted.

Amount-Grouping Module

Amount-Grouping Overview

Public need output prediction for lower levels in the hierarchy might result in poor statistical predictions due to insufficient public need output amount and large random variations. Reliable predictions can be generated if there is a sufficient amount of data. Amount-grouping can be used to collect data and minimize random variation in data. By collecting data, stronger underlying public need output signals can be obtained. This may make public need output patterns easier to be detected by the models.

The amount-grouping module (e.g., the amount grouping module 1215) enables users to determine the appropriate prediction reconciliation level to ensure that the predictions are generated at a level with sufficient public need output amount while retaining, as much as possible, specific patterns of each public need output time series.

Amount-grouping module 1215 may generate a number of amount groups. These amount groups may be generated based on the user-specified amount threshold, which can be based on the public need output averages. A user can define a level in the hierarchy as the lowest grouping level. Starting from the lowest grouping level, if a series has sufficient amount, then a prediction may be generated at the lowest level to capture any series-specific patterns. Otherwise, the series may be collected to one level higher via the input hierarchy with other low volume series until it reaches a level with sufficient amount, or alternatively, it reaches the top level.

The process of amount-grouping can be run stand-alone, or after classification and pattern-clustering. Amount-grouping module 1215 may generate predictions at an amount-group level and disaggregate data down to lowest level. Two hierarchy-based amount-grouping types utilized by amount-grouping module 1215 include dynamic grouping and dynamic grouping with hierarchy restriction.

Dynamic Grouping

In a dynamic grouping type there can be two parameters defined as the amount threshold. For example, avg_demand_threshold and min_frequency_threshold. If the average demand of an aggregated time series is greater than, or equal to the avg_demand_threshold, and the number of demand occurrences is greater than, or equal to, the min_frequency_threshold, then the time series may be considered to have sufficient amount.

If a series at the lower level has sufficient numbers of items, then the prediction may be generated at this particular level to capture any series-specific patterns. Otherwise, the time series may be collected to one level higher with other low-volume series until an aggregated time series reaches a level with sufficient-volume, or the combined time series reaches the top level. Some further details are illustrated through the following example.

Figure 25:
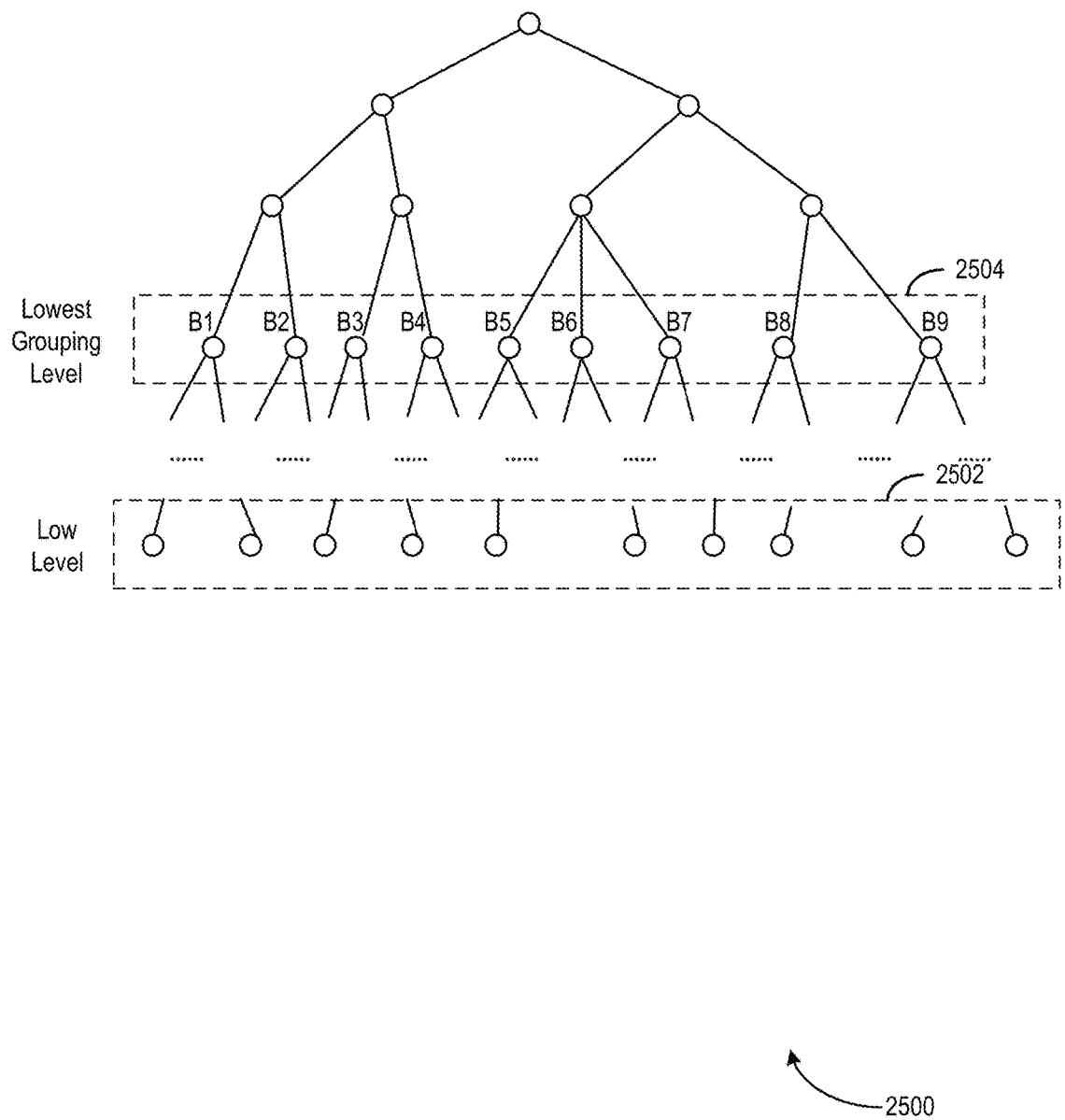
FIGS. 25-29 illustrate an example of a process for dynamic volume-grouping of one or more time series.

FIGS. 25-29 illustrate an example process for dynamic amount-grouping utilizing an amount-grouping module (e.g., the amount-grouping module 1215). FIG. 25 illustrates an example hierarchy prior to amount-grouping by the amount-grouping module 1215. As a first operation, the amount-grouping module 1215 may collect (i.e. aggregate) all series up from low level 2502 to a lowest grouping level 2504. At FIG. 26, the amount-grouping module 1215 may compare a public need output amount (average public need output and public need output occurrences) of each node of the hierarchy with one or more threshold values to determine if the node (e.g., the time series) has sufficient amount. Black nodes (e.g., nodes B4, B5, and B7) indicate nodes that have sufficient amount (e.g., the amount at such node is greater than a threshold amount). Dotted nodes (e.g., nodes B1, B2, B3, B6, B8, and B9) indicate low amount nodes, which do not have sufficient amount (e.g., an amount that is less than the threshold amount).

Figure 27:
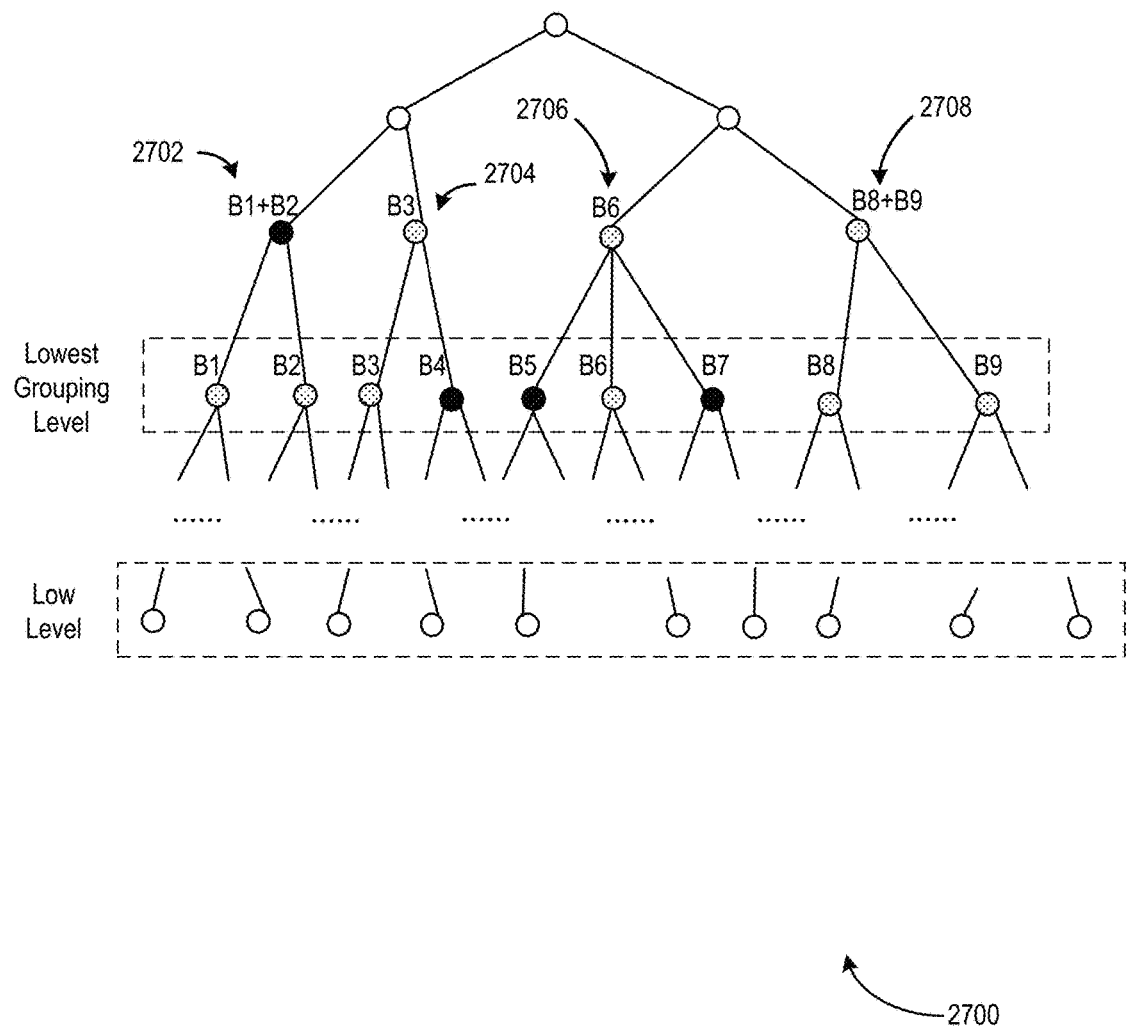

In FIG. 27, the amount-grouping module 1215 may combine all nodes with insufficient amount up one level in the hierarchy. In this example, amount grouping module 1215 combines node B1 with node B2 depicted with node B1+B2 at 2702. Nodes B3 and B6 may be determined by amount-grouping module 1215 to have sufficient amount, and thus those nodes may be moved up a level as depicted at 2704 and 2706, respectively. Additionally, amount group module 1215 may combine node B8 with node B9 to node B8+B9 at 2708. FIG. 27 shows the status of each node at the corresponding level: node B1+B2 has sufficient amount, while all the rest of the nodes still need to be combined further.

Figure 28:
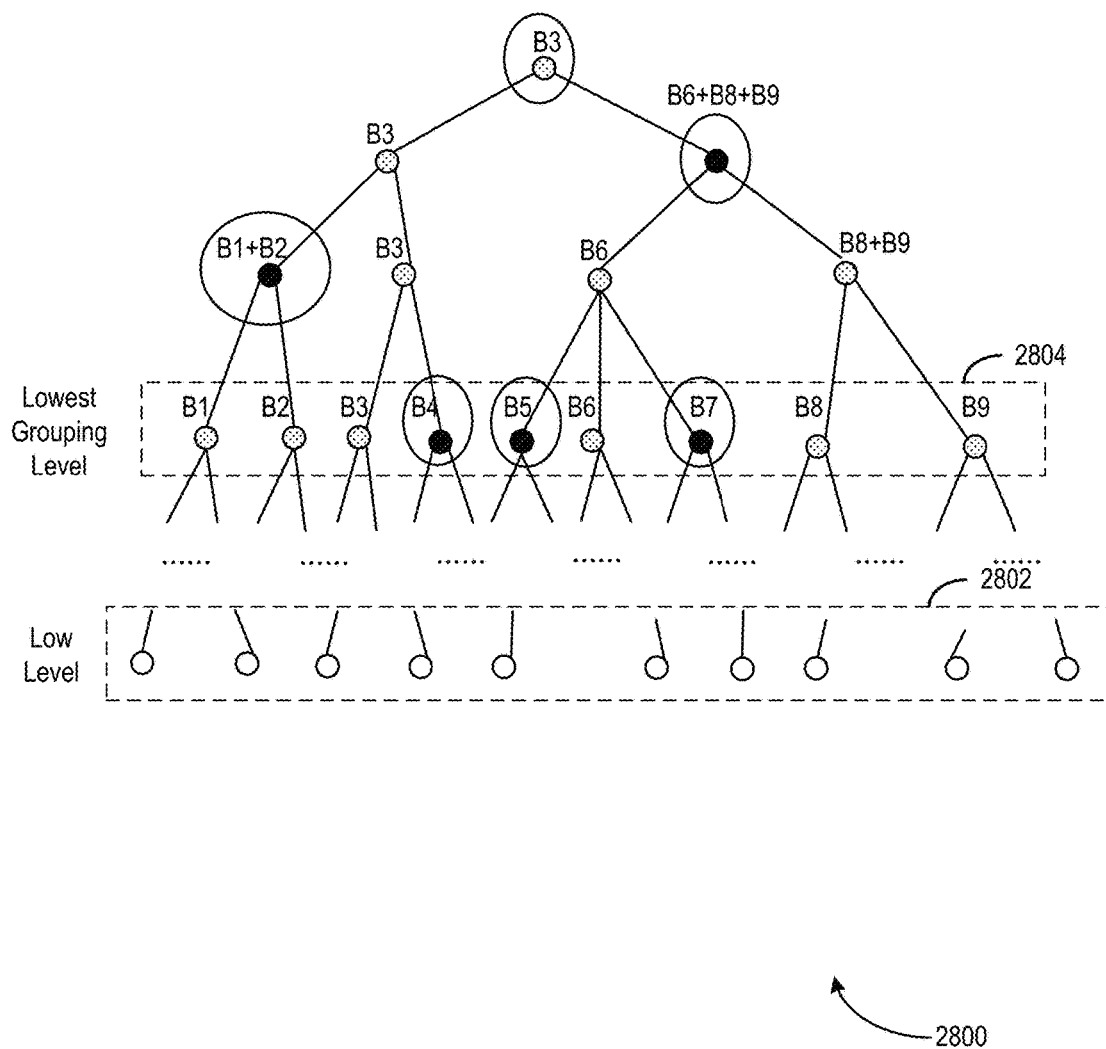
Figure 29:
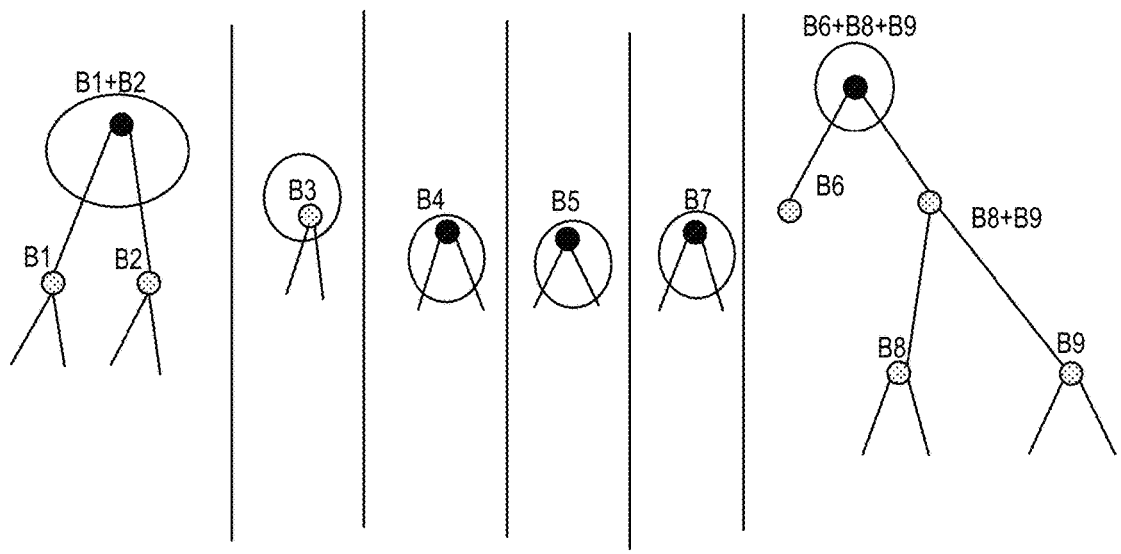

Amount-grouping module 1215 may repeat the process described above until each branch has a top-most node that exceeds the amount thresholds, or until the top of the hierarchy is reached. FIG. 28 depicts an example amount grouping in which black nodes depict nodes with sufficient amount. FIG. 29 illustrates an example set of final results using the dynamic grouping method of amount-grouping module 1215, with a result of six groups and three reconciliation levels. Five of the amount groups satisfy the amount threshold. B3 ends up as a low amount cluster since it reaches the top level.

Dynamic Grouping with Hierarchy Restriction

In the example shown in FIGS. 25-29, node B3 may be an amount group, even though node B3 does not have sufficient public need. This outcome might not satisfy customer needs, since a customer may require that all groups have sufficient public need output in order to generate a prediction. For example, restrictions may be added when conducting the dynamic grouping. If a series at a lower level has sufficient amount, or if any of its siblings do not have sufficient amount, all nodes with a common parent may be combined (e.g., by amount-grouping module 1215) to keep the original hierarchy. Amount-grouping module 1215 may assign a group to the node if all sibling nodes of the node have sufficient amount.

Figure 26:
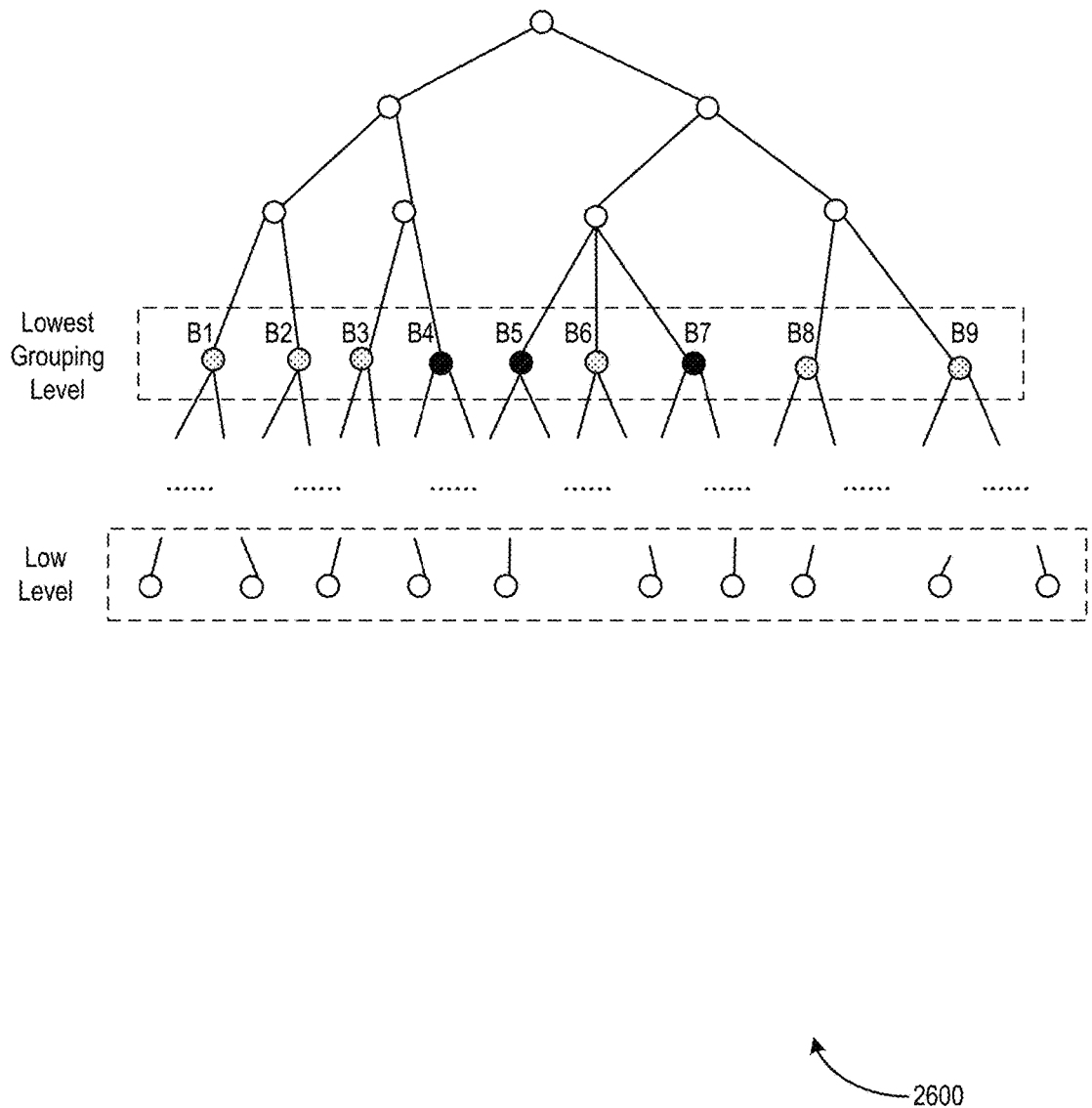

As used herein, "qualified nodes" are nodes that pass the amount threshold, while "unqualified nodes" are nodes that do not pass the amount threshold. In at least one example, if the number of unqualified nodes exceed a certain percentage of the total number of siblings (min_unqualified_node_count_pct), or the total demand of the unqualified nodes is greater than a certain percentage of the total demand of all siblings (min_unqualified_volume_pct), then the sibling nodes may be combined and continue the process. Otherwise, all siblings may be assigned a group and the current level may be selected as the level to reconcile. In one example, the same hierarchy may be used from FIG. 25. As depicted in FIG. 26, nodes B4, B5 and B7 are qualified nodes, but not all of them have unqualified siblings. Therefore, nodes B4, B5, and B7 need to be aggregated to the next highest level.

Figure 30:
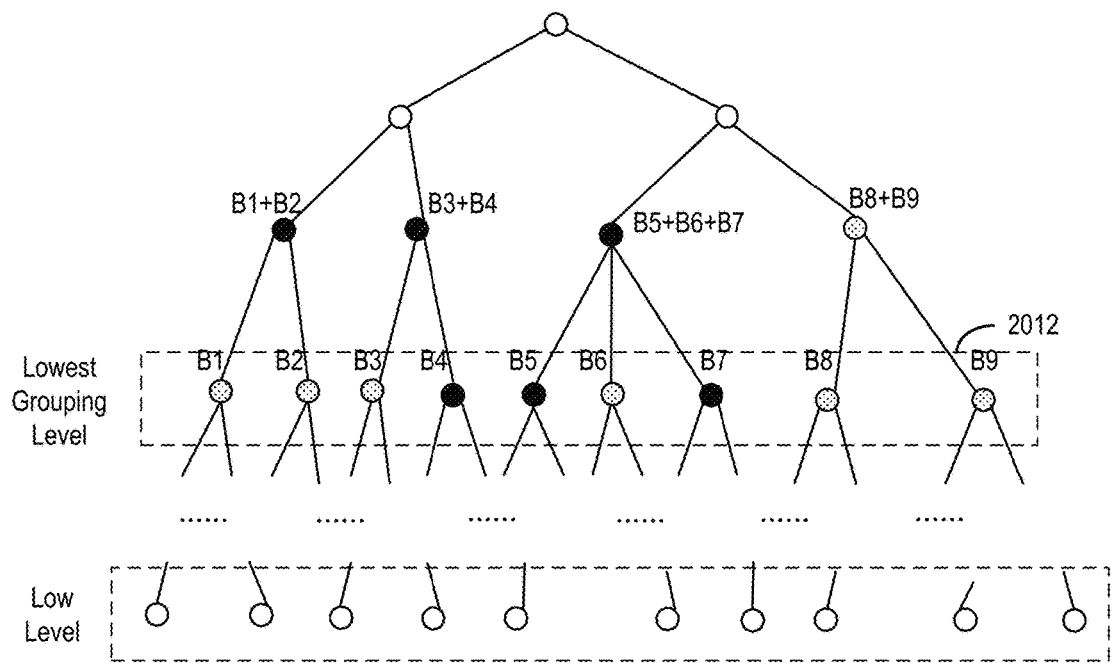
FIGS. 30-32 illustrate an example of a process for dynamic volume-grouping with hierarchy restriction of one or more time series.
Figure 31:
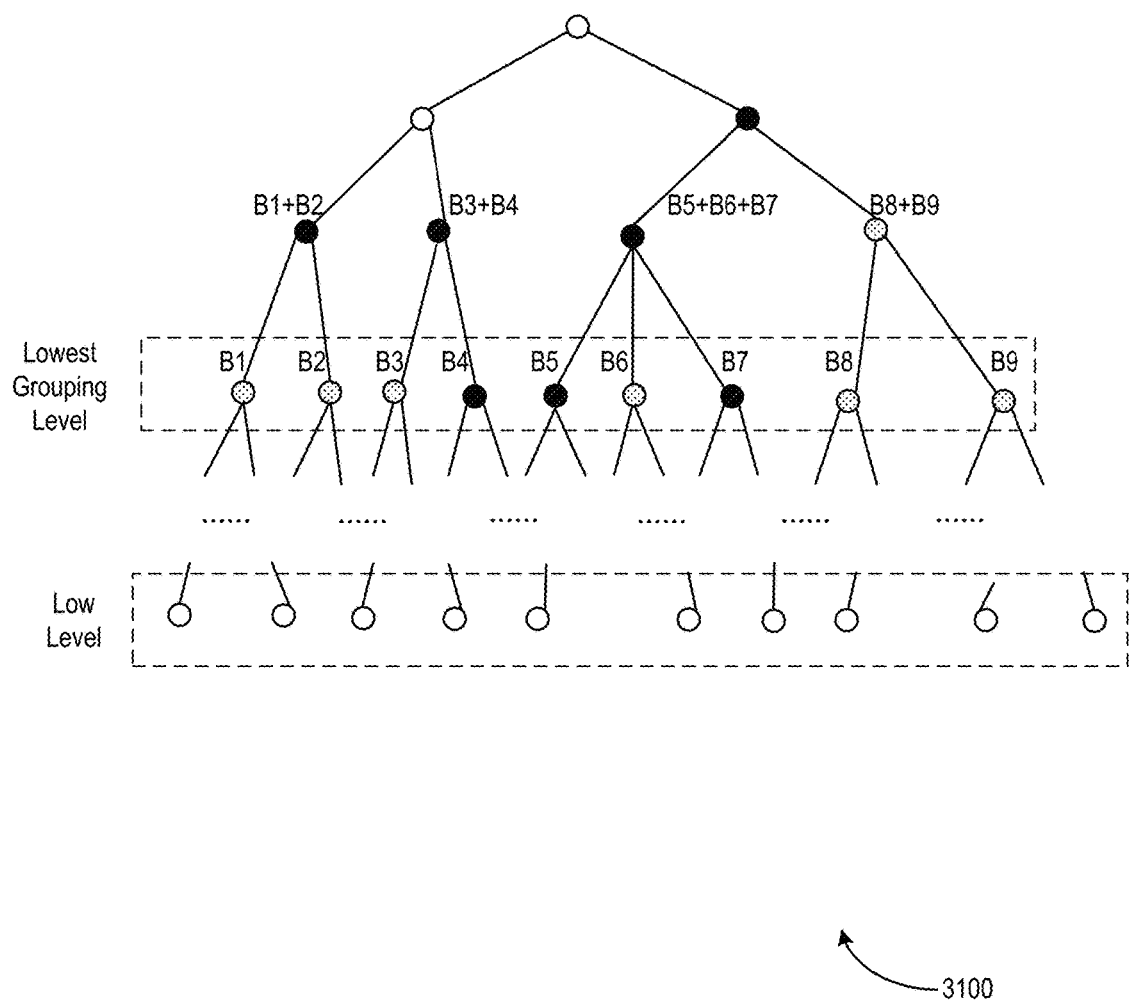
Figure 32:
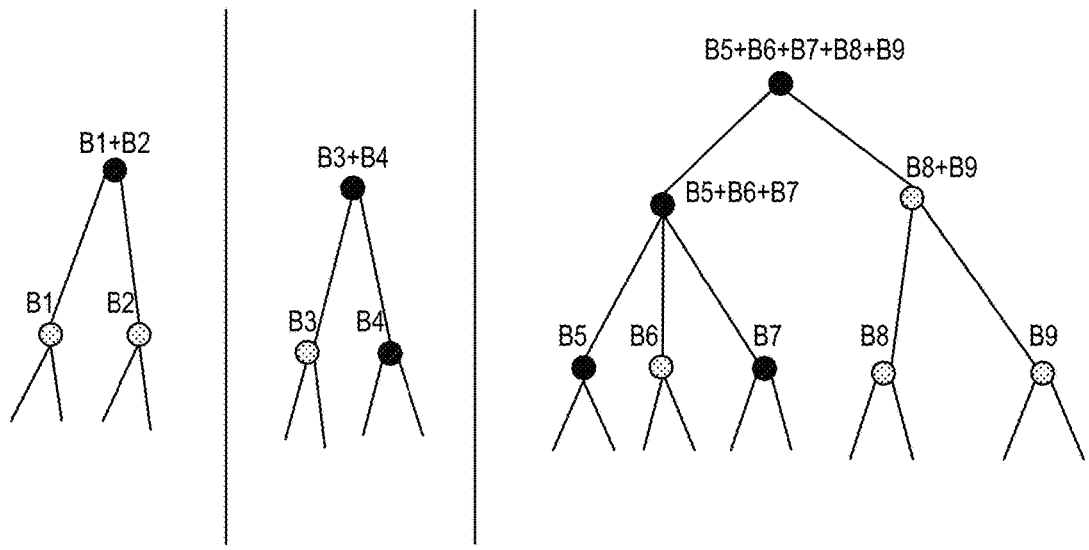

As depicted in FIG. 30, node B5+B6+B7 is a qualified node, however, its sibling B8+B9 is still unqualified. Therefore, it still needs to aggregated in the data structure to a higher level, until all siblings are qualified nodes as depicted in FIG. 31. FIG. 32 illustrates the resulting aggregation in the data structure with three amount groups and two reconciliation levels.

Process Example

Figure 33:
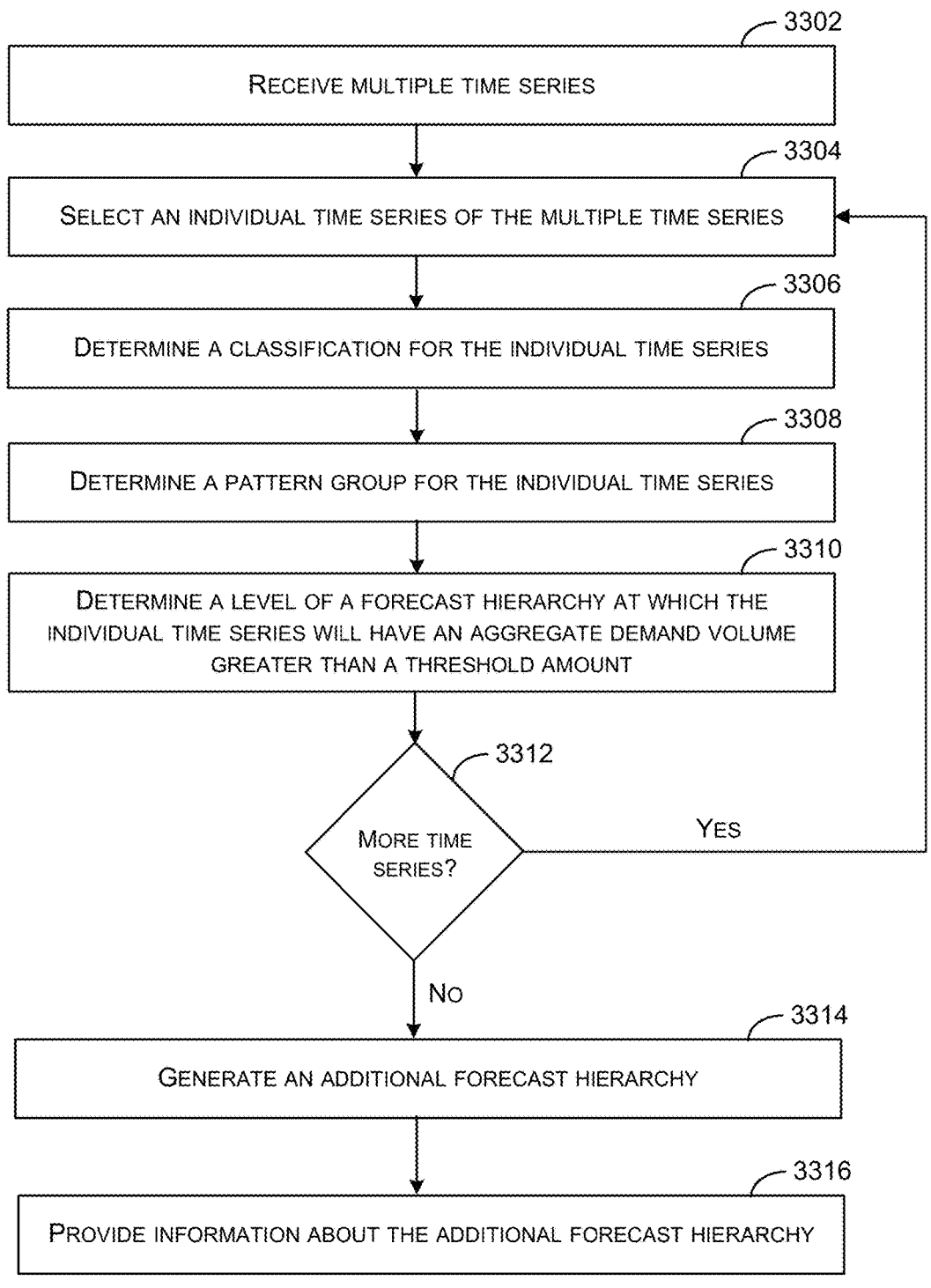
FIG. 33 illustrates an example of a flow diagram for modifying, by a DCS engine, a prediction hierarchy.

FIG. 33 illustrates an example of a flow diagram 3300 for modifying, by a DCS engine (e.g., the DCS engine 1209 of FIG. 12), a prediction hierarchy. The flow 3300 may begin at block 3302, where multiple time series are received (e.g., by DCS engine 1209 of FIG. 12). For example, the multiple time series may be included in a prediction hierarchy (e.g., the prediction hierarchy of FIG. 25, where each node of the prediction hierarchy represents a time series). The prediction hierarchy may depict relationships between time series, for example, parent-child relationships. In at least one example, a parent time series may relate to a broader category of items than an item for which a child time series may relate. A parent time series may include performance information, for example, of candy in a supermarket. A child time series of the parent time series may include performance information, for example, of chocolate candy in the supermarket. Another child time series of the parent time series may include performance information of Christmas candy in the supermarket. Each time series may include one or more public need output characteristics and one or more public need output patterns for an item.

At block 3304, an individual time series of the multiple time series may be selected. For example, the prediction hierarchy may be traversed to select a time series. Alternatively, time series may be selected at random.

At block 3306, a classification for the individual time series may be determined. The classification may be determined (e.g., by classification module 1211 of FIG. 12) in a manner similar to that described above with respect to public need output classification. For example, public need output gaps may be identified in order to determine cycles of the time series. Depending on the length and frequency of the cycles, a classification may be determined for the time series.

At block 3308, a pattern group for the individual time series may be determined (e.g., by pattern-clustering module 1213 of FIG. 12). The pattern group may be determined in a manner similar to that described above with respect to pattern-clustering. For example, time series having public need output cycles during a same, or similar, time of year may be clustered together using k-means and hierarchical clustering algorithms. Time series belonging to the same cluster may be assigned a common pattern group.

At block 3310, a level of the prediction hierarchy at which the individual time series will have an aggregate public need output amount greater than a threshold amount may be determined (e.g., by amount-grouping module 1215 of FIG. 12). A collective public need output amount for the individual time series may be determined through dynamic grouping or dynamic grouping with hierarchy restrictions as described above.

At block 3312, a determination as to whether or not more time series are in the prediction hierarchy is made. If more time series exist, then the flow may proceed back to block 3304 and block 3304 to block 3312 may be repeated until no more time series exist in the hierarchy that have not been classified, grouped, and aggregated according to block 3306 through block 3310.

When no more time series exist in the prediction hierarchy, the flow may proceed to block 3314 where a second prediction hierarchy may be generated (e.g., by DCS engine 1209 of FIG. 12). Though the flow depicts generating the second prediction hierarchy as a final step, it should be understood that the second prediction hierarchy may alternatively be incrementally generated at any point between block 3302 and block 3310. In at least one example, generation of the second prediction hierarchy may include associating classification data, pattern group data, or aggregation data to a node of the first prediction hierarchy. Alternatively, generation of the second prediction hierarchy may include modifying metadata related to each node, or time series, included in the first prediction hierarchy. Further, a second prediction hierarchy, separate from the first prediction hierarchy may be generated, the second prediction hierarchy having a different arrangement of nodes based on at least one of the classification data, the pattern group data, or the aggregation data associated with each time series included in the second prediction hierarchy.

At block 3316, prediction information related to at least one time series of the multiple time series may be provided, for example, to a user. In at least one example, such prediction information (e.g., optional outputs, statistics regarding each time series, clustering measurements, and the like) may be useful for a downstream process.

Figure 34:
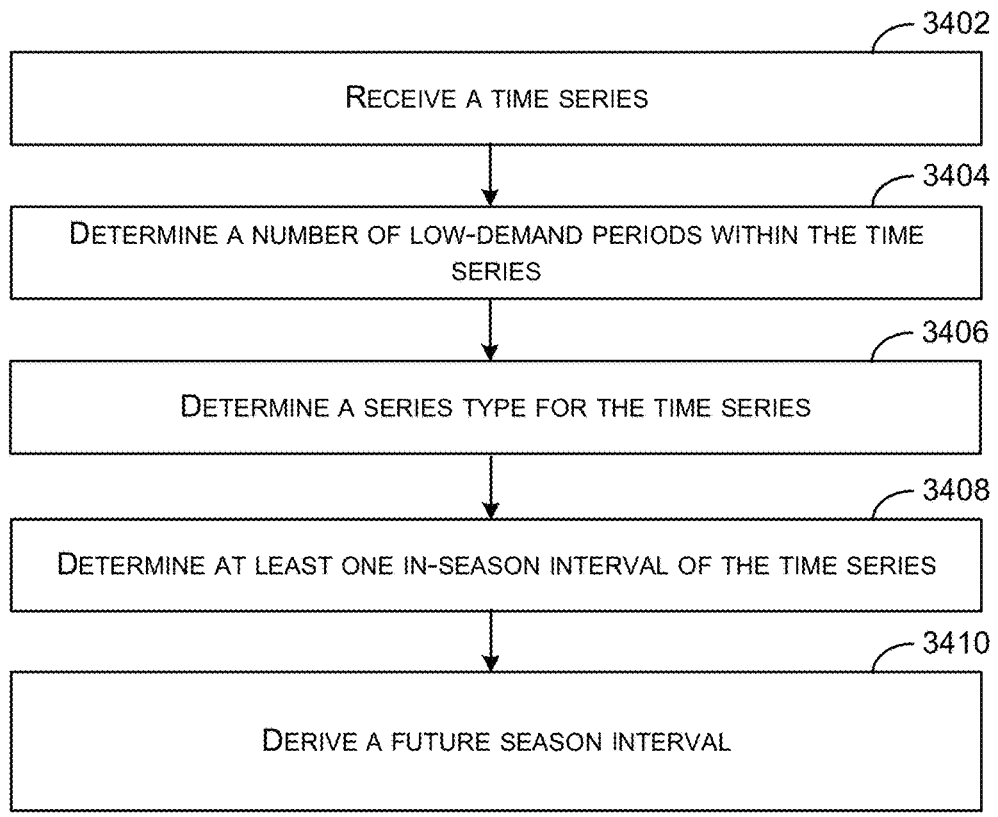
FIG. 34 illustrates an example of a flow diagram for generating user variable intervals for use in analyzing one or more time series.

FIG. 34 illustrates an example of a flow diagram 3400 for generating a variable interval. The flow 3400 may begin at block 3402, where a time series may be received. The time series may include one or more demand characteristics and one or more demand patterns for an item (e.g., an item offered for consumption).

At block 3404, a number of low-demand periods within the time series may be determined (e.g., by variable intervals module 1217 of FIG. 12). For example, periods of time for which demand is less than a threshold value may be determined. These period of time may be treated as a low-demand period. The threshold value may be non-zero.

At block 3406, variable intervals module 1217 may determine a series type for the time series based on the determined low-demand period(s) from block 3404. The series type may be determined by identifying whether a demand period within the time series is above or below a time period threshold value. If the demand period is at or above the threshold length, then the time series' series type may be determined to be "seasonal." If the demand period is below the threshold length, and a pre-defined event occurs during the demand period, then series type for the time series may be determined to be "event."

At block 3408, variable intervals module 1217 may determine a time period interval of the time series based on the number of low-demand periods and the series type. The interval may indicate a time interval for which the item has been in demand.

At block 3410 user variable intervals module 1217 may derive a time period interval based on the determined interval. The interval may be a predicted time interval during which demand for the item is predicted to be greater than a threshold value.

An embodiment may include a system for performing data mining and statistical learning techniques on a data set, the system comprising a processor and a non-transitory computer-readable storage medium including instructions stored thereon. When the instructions are executed by the processor, they cause the system to perform operations including: receiving a plurality of time series included in a prediction hierarchy for performing statistical learning to develop a prediction hierarchy, each individual time series of the plurality of time series comprising one or more need output characteristics and a need output pattern for an object, the one or more need output characteristics including at least one of a need output data, an intermittence, or a time period of the year, the need output pattern indicating one or more time intervals for which need output for the object is greater than a threshold value; pre-processing data associated with each of the plurality of time series, wherein the pre-processing includes performing tasks in parallel using a grid-enabled computing environment, the tasks comprising, for each time series of the plurality of time series: determining a classification for the individual time series based on the one or more need output characteristics; determining a pattern group for the individual time series by comparing the need output pattern to need output patterns for other time series in the plurality of time series; and determining a level of the prediction hierarchy at which the each individual time series comprises a need output amount greater than a threshold amount; generating an additional prediction hierarchy using the first prediction hierarchy, the classification, the pattern group, and the level, wherein utilizing the additional prediction hierarchy generates more accurate need output predictions than need output predictions generated utilizing the prediction hierarchy; and transmitting, to one or more nodes in the grid-enabled computing environment, prediction data related to at least one time series of the plurality of time series based on the additional prediction hierarchy, wherein the additional prediction hierarchy provides user control of the data set when the additional prediction hierarchy applied to the data set and characteristics of the data set. The above instructions may also be implemented as a method or as a computer-program product tangibly embodied in a non-transitory machine-readable storage medium, including the instructions.

In an aspect, the need output amount includes a summation of need output volumes of one or more time series of the plurality of time series. In another aspect, the system may further comprise instructions, which when executed by the processor, cause the system to perform operations including: determining a number of low-demand periods within the individual time series, wherein each of the number of low-demand periods is a time period during which need output for the item is less than a threshold value; identifying a number of cycles based on the number of low-demand periods; and determining a preliminary classification for the time series based on the identified number of cycles and the one or more need output characteristics. In another aspect, the instructions that are configured to cause the data processing apparatus to determine the number of low-demand periods within the individual time series are further configured to be executed to cause the data processing apparatus to determine an approximate time series utilizing a segmentation algorithm and the individual time series, wherein the number of low-demand periods are determined based on the approximate time series. In another aspect, the preliminary classification comprises one of a short-history classification, a low-volume classification, a short time-span non-intermittent classification, a short time-span intermittent classification, a long time-span time period classification, a long time-span non-seasonal classification, a long time-span intermittent classification, a long time-span time period intermittent classification, or a long time-span unclassifiable classification. In another aspect, the system may further comprise instructions, which when executed by the processor, cause the system to perform operations including: performing a horizontal reclassification of the individual time series using a classification of one or more sibling time series, the one or more sibling time series belonging to a common parent node in the first prediction hierarchy as the individual time series when the individual time series is classified as unclassifiable. In another aspect, the system may further comprise instructions, which when executed by the processor, cause the system to perform operations including: determining the horizontal reclassification based on a most frequently used classification among the one or more sibling time series; and assigning the horizontal reclassification to a subset of the individual time series. In another aspect, the system may further comprise instructions, which when executed by the processor, cause the system to perform operations including: performing a top-down reclassification of the individual time series using a parent time series of the individual time series as indicated in the first prediction hierarchy when the determined classification for the individual time series is long time-span intermittent. In another aspect, the system may further comprise instructions, which when executed by the processor, cause the system to perform operations including: generating an initial set of time-series clusters using a first number of clusters, a k-means clustering algorithm, and the plurality of time series; determining an optimal number of clusters using a hierarchical clustering technique applied to the initial set of time-series clusters; and determining an optimal set of time-series clusters using the optimal number of clusters, the k-means clustering algorithm, and the plurality of time series. In another aspect, the system may further comprise instructions, which when executed by the processor, cause the system to perform operations including: determining a lowest grouping level of the prediction hierarchy; determining a user-defined grouping level of the prediction hierarchy; and for each level of the prediction hierarchy between, and including, the user-defined grouping level and the lowest grouping level: determining a need output volume amount for one or more sibling time series in the prediction hierarchy; and aggregating the one or more sibling time series in the prediction hierarchy based on the need output volume amount.

Another embodiment may include a system for performing data mining and statistical learning techniques on a data set, the system comprising a processor and a non-transitory computer-readable storage medium including instructions stored thereon. When the instructions are executed by the processor, they cause the system to perform operations including: receiving a plurality of time series included in a forecast hierarchy, each individual time series of the plurality of time series comprising one or more demand characteristics and a demand pattern for an item, the one or more demand characteristics including at least one of a demand lifecycle, an intermittence, or a seasonality, the demand pattern indicating one or more time intervals for which demand for the item is greater than a threshold value; for each time series of the plurality of time series: determining a classification for the individual time series based on the one or more demand characteristics; determining a pattern group for the individual time series by comparing the demand pattern to demand patterns other time series in the plurality of time series; and determining a level of the forecast hierarchy at which the each individual time series comprises an aggregate demand volume greater than a threshold amount; generating an additional forecast hierarchy using the first forecast hierarchy, the classification, the pattern group, and the level, wherein utilizing the additional forecast hierarchy generates more accurate demand forecasts than demand forecasts generated utilizing the first forecast hierarchy; and providing to a user of the computer-program product, forecast information related to at least one time series of the plurality of time series based on the additional forecast hierarchy. The above instructions may also be implemented as a method or as a computer-program product tangibly embodied in a non-transitory machine-readable storage medium, including the instructions.

The term "need output" or "public need output" as used herein may be used interchangeably with or to mean the term "demand" as used herein. Furthermore, the term "prediction" or "predicting" as used herein may be used interchangeably with or to mean the term "forecast" as used herein. Furthermore, the term "time period" or "time period of the year" as used herein may be used interchangeably with or to mean the term "season" or "seasonality" as used herein. Furthermore, the term "perform" or "performance" as used herein may be used interchangeably with or to mean the term "sale" or "sell" as used herein. Furthermore, the term "user variable" or "variable" as used herein may be used interchangeably with or to mean the term "custom" as used herein. Furthermore, the term "upcoming" as used herein may be used interchangeably with or to mean the term "future" as used herein. Furthermore, the term "amount" as used herein may be used interchangeably with or to mean the term "volume" as used herein. Furthermore, the term "object" or "item" as used herein may be used interchangeably with or to mean the term "product" as used herein. Furthermore, the term "section" as used herein may be used interchangeably with or to mean the term "department" (e.g. of a store) as used herein.

Furthermore, the computer system may transmit a message or other correspondence (e.g. an alert) to notify a user, set of users, other computer system, etc. that the system has generated or provided prediction (i.e. forecast) information. For example, the system may use a server (e.g. transmission server) with a microprocessor and a memory to store preferences of the user(s) to transmit the alert or other notification, transmit the alert from the server over a data channel to a wireless device, and provide a viewer application that causes the notification to display on one or more user computers. The system may also enable a connection from the user computer to the storage that includes the data sets over the internet when a user attempts to connect to the system.

In some examples described herein, the systems and methods may include data transmissions conveyed via networks (e.g., local area network, wide area network, Internet, or combinations thereof, etc.), fiber optic medium, carrier waves, wireless networks, etc. for communication with one or more data processing devices. The data transmissions can carry any or all of the data disclosed herein that is provided to or from a device.

Some aspects may utilize the Internet of Things (IoT), where things (e.g., machines, devices, phones, sensors) can be connected to networks and the data from these things can be collected and processed within the things and/or external to the things. For example, with the IoT there can be sensors in many different devices, and high value analytics can be applied to identify hidden relationships and drive increased efficiencies. This can apply to both Big Data analytics and real-time (e.g., event stream processing) analytics. Some aspects may involve fog computing and/or cloud computing.

Optionally, notifications may be generated that may be transmitted to and/or displayed by a remote system. For example, a summary report identifying stress scenario specification, transition matrices, output flows, etc. may be generated, for example based on the structure definition, stress scenario specification, and/or input received, and this report may be transmitted to a remote system. Optionally, the remote system may generate a notification of the report in order to alert a user that a determination or generating process is completed. This may advantageously allow a user to remotely initialize a determination or generation processes and then be alerted, such as via a notification wirelessly received on a mobile device, when the processing is complete and a report may be available. Optionally, a report and/or results of the output flow generation may be transmitted over a network connection to a mobile or remote device.

User preferences may be identified to determine which information to include in a report or which results to be provided to a user. Such preferences may facilitate reducing the total information provided to a user, such as via a mobile device, to allow for more expedient transmission and notification. Additionally, there may be significant user requests for remote processing capacity such that a user may need to have prompt notification of completion of a request in order to queue their next request. Such a notification and report alert system may facilitate this.

The systems, methods, and products described herein are useful for data analysis. In one aspect, this disclosure provide tools for analyzing large sets of data, such as large sets of digital data, and converging on fewer or one exact data point within the data set. Aspects of the current disclosure provide technical solutions to the technical problem of how to efficiently sort, process, evaluate and make use of large quantities of digital or electronic data. As such, the problem addressed by this disclosure specifically arises in the realm of computers and networks and this disclosure provides solutions necessarily rooted in computer technology. For example, in embodiments, this disclosure is directed to more than just retrieving and storing the data sets and include aspects that transform the data from one form into a new form through using various big data analysis techniques across multiple iterations that may include filtering, aggregation, prediction, determination and reconciliation processes.

While this disclosure may contain many specifics, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be utilized. Moreover, the separation of various system components in the implementations described above should not be understood as requiring such separation in all implementations, and it should be understood that the described program components and systems can generally be integrated together in a single software or hardware product or packaged into multiple software or hardware products.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

What is claimed is:

1. A system for performing data mining and statistical learning techniques on a data set, the system comprising:
a processor; and
a non-transitory computer-readable storage medium including instructions stored thereon, which when executed by the processor, cause the system to perform operations including:
receiving a time series for performing statistical learning to develop improved object prediction intervals, wherein the time series includes one or more demand characteristics and a demand pattern for an object;
pre-processing data associated with the time series, wherein the pre-processing includes tasks performed in parallel using a grid-enabled computing environment;
determining a number of low demand periods within the time series, a low demand period being a time interval for which demand for the object is less than a threshold value;
determining a series type for the time series using the number of low demand periods;
determining an in-season interval of the time series using the number of low demand periods and the series type, the in-season interval indicating a demand period for which demand for the object has historically been greater than the threshold value;
deriving a future in-season interval using the determined in-season interval, the future in-season interval being a predicted time interval during which demand for the object is predicted to be greater than the threshold value; and
transmitting, to one or more nodes in the grid-enabled computing environment, prediction data related to the time series based on the derived future in-season interval, wherein the derived future in-season interval provides user control of the data set when the derived future in-season interval is applied to the data set and characteristics of the data set.

2. The system of claim 1, wherein determining the number of low demand periods within the time series further includes determining an approximate time series utilizing a segmentation algorithm and the time series, wherein the number of low demand periods are determined using the approximate time series.

3. The system of claim 1, wherein determining the number of low demand periods further includes determining whether the demand period exceeds a threshold amount of time.

4. The system of claim 1, wherein the time series includes time series aggregated data from a plurality of time series, the plurality of time series individually comprising at least one demand characteristic and at least one demand pattern for an object.

5. The system of claim 1, wherein the operations further include identifying an incomplete seasonal period of the time series, the incomplete seasonal period beginning with data that is greater than the threshold value.

6. The system of claim 5, wherein the operations further include excluding the incomplete seasonal period from the time series.

7. The system of claim 1, wherein the operations further include:
   determining a mean period for the in-season interval of the time series;
   associating the time series with a seasonal series type based on a determination that the mean period is greater than a seasonal threshold amount; and
   associating the time series with an event series type based on a determination that the mean period is less than the seasonal threshold amount.

8. The system of claim 7, wherein the operations further include determining, when the time series is associated with the seasonal series type, a season start index corresponding to a day of a year on which a season begins, wherein determining the in-season interval is based on the season start index.

9. The system of claim 7, wherein the operations further include, when the time series is associated with the event series type:
   determining an event index corresponding to a day of a year on which an event occurs in the time series;
   determining a season start index for the in-season interval based on the event index; and
   determining a season end index for the in-season interval based on th the event index, wherein the determined in-season interval is further based on the season start index and the season end index.

10. The system of claim 1, wherein determining the in-season interval using the number of low demand periods and the series type further include receiving user input selecting a calculation of at least one of a minimum period, a maximum period, a mean period, and a mode period.

11. A computer-program product tangibly embodied in a non-transitory machine-readable storage medium, the computer-program product including instructions for performing data mining and statistical learning techniques on a data set, the instructions configured to be executed to cause a data processing apparatus to perform operations including:
   receiving a time series for performing statistical learning to develop improved object prediction intervals, wherein the time series includes one or more demand characteristics and a demand pattern for an object;
   pre-processing data associated with the time series, wherein the pre-processing includes tasks performed in parallel using a grid-enabled computing environment, the tasks comprising;
   determining a number of low demand periods within the time series, a low demand period being a time interval for which demand for the object is less than a threshold value;
   determining a series type for the time series using the number of low demand periods;
   determining an in-season interval of the time series using the number of low demand periods and the series type, the in-season interval indicating a demand period for which demand for the object has historically been greater than the threshold value;
   deriving a future in-season interval using the determined in-season interval, the future in-season interval being a predicted time interval during which demand for the object is predicted to be greater than the threshold value; and
   transmitting, to one or more nodes in the grid-enabled computing environment, prediction data related to the time series based on the derived future in-season interval, wherein the derived future in-season interval provides user control of the data set when the derived future in-season interval is applied to the data set and characteristics of the data set.

12. The computer-program product of claim 11, wherein determining the number of low demand periods within the time series further includes determining an approximate time series utilizing a segmentation algorithm and the time series, wherein the number of low demand periods are determined using the approximate time series.

13. The computer-program product of claim 11, wherein determining the number of low demand periods further includes determining whether the demand period exceeds a threshold amount of time.

14. The computer-program product of claim 11, wherein the time series includes time series aggregated data from a plurality of time series, the plurality of time series individually comprising at least one demand characteristic and at least one demand pattern for an object.

15. The computer-program product of claim 11, wherein the operations further include identifying an incomplete seasonal period of the time series, the incomplete seasonal period beginning with data that is greater than the threshold value.

16. The computer-program product of claim 15, wherein the operations further include excluding the incomplete seasonal period from the time series.

17. The computer-program product of claim 11, wherein the operations further include:
   determining a mean period for the in-season interval of the time series;
   associating the time series with a seasonal series type based on a determination that the mean period is greater than a seasonal threshold amount; and
   associating the time series with an event series type based on a determination that the mean period is less than the seasonal threshold amount.

18. The computer-program product of claim 17, wherein the operations further include determining, when the time series is associated with the seasonal series type, a season start index corresponding to a day of a year on which a season begins, wherein determining the in-season interval is based on the season start index.

19. The computer-program product of claim 17, wherein the operations further include, when the time series is associated with the event series type:
   determining an event index corresponding to a day of a year on which an event occurs in the time series;
   determining a season start index for the in-season interval based on the event index; and
   determining a season end index for the in-season interval based on the event index, wherein the determined in-season interval is further based on the season start index and the season end index.

20. The computer-program product of claim 11, wherein determining the in-season interval using the number of low demand periods and the series type further include receiving user input selecting a calculation of at least one of a minimum period, a maximum period, a mean period, and a mode period.

21. A computer-implemented method for performing data mining and statistical learning techniques on a data set, comprising:
- receiving a time series for performing statistical learning to develop improved object prediction intervals, wherein the time series includes one or more demand characteristics and a demand pattern for an object;
- pre-processing data associated with the time series, wherein the pre-processing includes tasks performed in parallel using a grid-enabled computing environment, the tasks comprising;
- determining a number of low demand periods within the time series, a low demand period being a time interval for which demand for the object is less than a threshold value;
- determining a series type for the time series using the number of low demand periods;
- determining an in-season interval of the time series using the number of low demand periods and the series type, the in-season interval indicating a demand period for which demand for the object has historically been greater than the threshold value;
- deriving a future in-season interval using the determined in-season interval, the future in-season interval being a predicted time interval during which demand for the object is predicted to be greater than the threshold value; and
- transmitting, to one or more nodes in the grid-enabled computing environment, prediction data related to the time series based on the derived future in-season interval, wherein the derived future in-season interval provides user control of the data set when the derived future in-season interval is applied to the data set and characteristics of the data set.

22. The computer-implemented method of claim 21, wherein determining the number of low demand periods within the time series further includes determining an approximate time series utilizing a segmentation algorithm and the time series, wherein the number of low demand periods are determined using the approximate time series.

23. The computer-implemented method of claim 21, wherein determining the number of low demand periods further includes determining whether the demand period exceeds a threshold amount of time.

24. The computer-implemented method of claim 21, wherein the time series includes time series aggregated data from a plurality of time series, the plurality of time series individually comprising at least one demand characteristic and at least one demand pattern for an object.

25. The computer-implemented method of claim 21, further comprising identifying an incomplete seasonal period of the time series, the incomplete seasonal period beginning with data that is greater than the threshold value.

26. The computer-implemented method of claim 25, further comprising excluding the incomplete seasonal period from the time series.

27. The computer-implemented method of claim 21, further comprising:
- determining a mean period for the in-season interval of the time series;
- associating the time series with a seasonal series type based on a determination that the mean period is greater than a seasonal threshold amount; and
- associating the time series with an event series type based on a determination that the mean period is less than the seasonal threshold amount.

28. The computer-implemented method of claim 27, further comprising determining, when the time series is associated with the seasonal series type, a season start index corresponding to a day of a year on which a season begins, wherein determining the in-season interval is based on the season start index.

29. The computer-implemented method of claim 27, further comprising, when the time series is associated with the event series type:
- determining an event index corresponding to a day of a year on which an event occurs in the time series;
- determining a season start index for the in-season interval based on the event index; and
- determining a season end index for the in-season interval based on the event index, wherein the determined in-season interval is further based on the season start index and the season end index.

30. The computer-implemented method of claim 21, wherein determining the in-season interval using the number of low demand periods and the series type further include receiving user input selecting a calculation of at least one of a minimum period, a maximum period, a mean period, and a mode period.

* * * * *